United States Patent
Omori

(10) Patent No.: US 8,296,188 B2
(45) Date of Patent: Oct. 23, 2012

(54) IMAGE DISPLAY SYSTEM, SERVER APPARATUS, AND TERMINAL APPARATUS

(75) Inventor: Yusuke Omori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 44 days.

(21) Appl. No.: 12/501,073

(22) Filed: Jul. 10, 2009

(65) Prior Publication Data

US 2010/0030664 A1 Feb. 4, 2010

(30) Foreign Application Priority Data

Jul. 31, 2008 (JP) .................................. 2008-197931

(51) Int. Cl.
*G06Q 30/00* (2006.01)

(52) U.S. Cl. ......................... 705/26.1; 235/385; 235/383

(58) Field of Classification Search .................. 345/156; 348/208.3; 705/26, 26.1, 14
See application file for complete search history.

(56) References Cited

U.S. PATENT DOCUMENTS

| | | | | |
|---|---|---|---|---|
| 4,114,601 A | * | 9/1978 | Abels ............................... | 600/20 |
| 5,190,059 A | * | 3/1993 | Fabian et al. .................. | 128/899 |
| 5,819,032 A | * | 10/1998 | de Vries et al. ............... | 709/250 |
| 5,892,909 A | * | 4/1999 | Grasso et al. .................. | 709/201 |
| 5,926,796 A | * | 7/1999 | Walker et al. ................... | 705/16 |
| 5,930,761 A | * | 7/1999 | O'Toole ............................ | 705/5 |
| 5,931,824 A | * | 8/1999 | Stewart et al. ................. | 604/358 |
| 5,953,705 A | * | 9/1999 | Oneda ............................... | 705/5 |
| 5,970,470 A | * | 10/1999 | Walker et al. ............... | 705/14.27 |
| 6,076,007 A | * | 6/2000 | England et al. ............... | 600/424 |
| 6,198,504 B1 | * | 3/2001 | Nobuoka ................... | 348/208.3 |
| 6,366,206 B1 | * | 4/2002 | Ishikawa et al. ........... | 340/573.1 |
| 6,400,272 B1 | * | 6/2002 | Holtzman et al. ......... | 340/572.1 |
| 6,415,262 B1 | * | 7/2002 | Walker et al. .............. | 705/14.25 |
| 6,424,262 B2 | * | 7/2002 | Garber et al. .............. | 340/572.3 |
| 6,439,345 B1 | * | 8/2002 | Recktenwald et al. ......... | 186/55 |
| 6,516,416 B2 | * | 2/2003 | Gregg et al. ...................... | 726/8 |
| 6,535,857 B1 | * | 3/2003 | Clarke et al. .................... | 705/28 |

(Continued)

FOREIGN PATENT DOCUMENTS

JP 2002-117292 A 4/2002

(Continued)

OTHER PUBLICATIONS

Nonmember subs- or not?, Anne Graham, The Magazine for Magazine Management, Jun. 1, 1995. vol. 24, Iss. 10; p. 47, 2 pgs.*

(Continued)

*Primary Examiner* — Scott Zare
*Assistant Examiner* — Talia Crawley
(74) *Attorney, Agent, or Firm* — Birch, Stewart, Kolasch & Birch, LLP

(57) ABSTRACT

Commodity images that tend to be selected by a user can be smoothly and efficiently displayed on the user's terminal without requiring the user's effort. A server acquires a plurality of commodity images to be transmitted to a mobile terminal from a commodity DB based on a purchase history stored in a user DB and an image feature amount of image DB, and transmits the acquired commodity images to the mobile terminal. The mobile terminal receives the commodity images transmitted from the server and sequentially displays the received commodity images one by one as a slide show on the entire screen of a monitor. Therefore, the visual images of the commodities can be easily displayed without causing the user to perform special operations and without displaying extra information such as text.

9 Claims, 14 Drawing Sheets

U.S. PATENT DOCUMENTS

| | | | |
|---|---|---|---|
| 6,600,418 B2* | 7/2003 | Francis et al. | 340/572.1 |
| 6,640,214 B1* | 10/2003 | Nambudiri et al. | 705/26 |
| 6,669,089 B2* | 12/2003 | Cybulski et al. | 235/385 |
| 6,768,419 B2* | 7/2004 | Garber et al. | 340/572.4 |
| 6,809,645 B1* | 10/2004 | Mason | 340/572.1 |
| 6,861,954 B2* | 3/2005 | Levin | 340/572.1 |
| 6,900,731 B2* | 5/2005 | Kreiner et al. | 340/572.1 |
| 7,002,549 B2* | 2/2006 | McCahon et al. | 345/156 |
| 7,019,650 B2* | 3/2006 | Volpi et al. | 340/572.1 |
| 7,142,118 B2* | 11/2006 | Hamilton et al. | 340/572.1 |
| 7,263,499 B2* | 8/2007 | Kunigita | 705/26.64 |
| 7,280,978 B1* | 10/2007 | Joao | 705/16 |
| 7,307,530 B2* | 12/2007 | Fabian et al. | 340/572.1 |
| 2001/0051897 A1* | 12/2001 | Loeb et al. | 705/14 |
| 2002/0067263 A1* | 6/2002 | Tafoya et al. | 340/572.1 |
| 2002/0143320 A1* | 10/2002 | Levin | 606/1 |
| 2003/0066537 A1* | 4/2003 | Fabian et al. | 128/899 |
| 2003/0105394 A1* | 6/2003 | Fabian et al. | 600/407 |
| 2004/0084525 A1* | 5/2004 | Kreiner et al. | 235/384 |
| 2004/0129279 A1* | 7/2004 | Fabian et al. | 128/899 |
| 2004/0201479 A1* | 10/2004 | Garber et al. | 340/572.1 |
| 2004/0250819 A1* | 12/2004 | Blair et al. | 128/899 |
| 2005/0033654 A1* | 2/2005 | Takagi et al. | 705/26 |
| 2007/0018952 A1* | 1/2007 | Arseneau et al. | 345/156 |
| 2007/0093709 A1* | 4/2007 | Abernathie | 600/407 |
| 2007/0290030 A1* | 12/2007 | Fox et al. | 235/375 |
| 2008/0077487 A1* | 3/2008 | Davis et al. | 705/14 |
| 2009/0171760 A1* | 7/2009 | Aarnio et al. | 705/10 |

FOREIGN PATENT DOCUMENTS

| | | |
|---|---|---|
| JP | 2003-208426 A | 7/2003 |
| JP | 2006-309342 A | 11/2006 |

OTHER PUBLICATIONS

Zacks et al, 7 Startups Graduate with Honors, Sep. 2001, Technology Review, vol. 104 No. 7, pp. 71-78.*

Nursing Management, Medical Patents: Remote Monitoring: Expanding a successful system, Capuano et al: May 1997. vol. 28, Issue 5; pp. 40A, 2pgs.*

Feds in a Web World: public domain vs. copyright, Stephanie C. Ardito, Searcher Magazine. Mar. 1998. vol. 6, Iss. 3, p. 35, 12 pgs.*

Nonmember subs- or not?, Anne Graham, The Magazine for Magazine Management, Jun., 1, 1995. vol. 24, Iss. 10; p. 47, 2 pgs.*

"alook": A Technology Displaying Products Randomly on Amazon.co.jp, Windows 100%, Japan, Shinyusha Co., Ltd., Feb. 1, 2007, vol. 10, Issue 2, p. 19.

Japanese Office Action issued on Aug. 1, 2012, in JP Application No. 2008-197931.

* cited by examiner

FIG.2

| MODEL NAME | THE NUMBER OF PIXELS | THE NUMBER OF COLORS | DATA SIZE | ... |
|---|---|---|---|---|
| AA-001 | 160*120 | 256 COLORS | 100KB | ... |
| BB-100 | 320*240 | 65536 COLORS | 1MB | ... |
| ... | ... | ... | ... | ... |

29

IMAGE DISPLAY SYSTEM, SERVER APPARATUS, AND TERMINAL APPARATUS

BACKGROUND OF THE INVENTION

1. Field of the Invention

The present invention relates to an image display system, a server apparatus, and a terminal apparatus, and more particularly to an image display system, a server apparatus, and a terminal apparatus by which images are displayed as a slide show.

2. Description of the Related Art

Currently the use of e-commerce through mobile terminals is increasing year by year. For example, as described in Japanese Patent Application Laid-Open Nos. 2006-309342 and 2002-117292, information introducing commodities (recommendation information) is often transmitted to mobile terminals. Many of these transmissions are information distribution and commodity introduction by HTML, text e-mail, and the like.

The present invention has been made in view of the above situations, and it is an object of the present invention to provide an image display system, a server apparatus, and a terminal apparatus by which commodity images that tend to be selected by the user can be smoothly and efficiently displayed on the user's terminal without requiring the user's effort.

SUMMARY OF THE INVENTION

However, if the commodity recommendation information is transmitted to a mobile terminal by text, e-mail, and the like as described in Japanese Patent Application Laid-Open Nos. 2006-309342 and 2002-117292, a user must check the content, read extra information for seeing images of commodities, and perform operations for displaying the images.

Especially for a commodity for which information about its appearance is important, the information about the appearance of the commodity is needed first. First the user likes the appearance of the commodity, and then needs detailed description of the commodity. That is, for commodities for which information about the appearance is important, it is necessary to show images of the commodities to the user as easily and efficiently as possible.

Even with images of commodities displayed, operations of searching many commodities for one that suits the user's taste are laborious for the user. Therefore, the ability of the user to efficiently obtain desired information will be of help for the user's purchase process.

An image display system according to a first aspect of the present invention is an image display system including a server apparatus and a customer terminal apparatus, wherein the server apparatus includes: a commodity database in which images of commodities, detailed information about the commodities, and link information to the detailed information are stored in association with each other; a commodity group determination device that determines a group of commodities to be transmitted to the terminal apparatus among the commodities stored in the commodity database; and a server-side transmission device that transmits, to the terminal apparatus, images of the group of commodities determined by the commodity group determination device and link information to detailed information about the commodities corresponding to the images, and the terminal apparatus includes: a display device; a terminal-side reception device that receives the images of the group of commodities and the link information to the detailed information about the commodities corresponding to the images, transmitted from the server apparatus; a first display control device that sequentially displays the images of the group of commodities received by the terminal-side reception device one by one as a slide show on the display device, the first display control device controlling the display of the images of the commodities so that the entire image of each commodity displayed one by one is displayed on the entire display device; a reception device that receives selection input for an image displayed on the display device; a detailed information acquisition device that acquires, in response to the reception device receiving the selection input, detailed information about a commodity corresponding to the image for which the reception device has received the selection input, from the commodity database based on the link information received by the terminal-side reception device; and a second display control device that displays the detailed information acquired by the detailed information acquisition device on the display device.

According to the image display system of the first aspect, the server apparatus determines a group of commodities to be transmitted to the terminal apparatus from the commodity database in which images of commodities are stored, and transmits images of the determined group of commodities and link information to detailed information about the group of commodities to the terminal apparatus. The terminal apparatus receives the images of the group of commodities transmitted from the server apparatus and sequentially displays the received images of the group of commodities one by one as a slide show on the display device. This allows the visual images of the commodities to be easily displayed without causing the user to perform special operations and without displaying extra information such as text. Therefore, the appeal of the commodities for which visual recognition is important can be directly conveyed to the user. When selection input is provided for a displayed image, detailed information about a commodity corresponding to the image for which the selection input has been received is acquired from the commodity database based on the link information received along with the images of the group of commodities, and the detailed information is displayed. Therefore, the visual image of the commodity can be displayed first, and then the information such as text can be displayed only if needed.

An image display system according to a second aspect of the present invention is the image display system according to the first aspect, wherein the server apparatus further includes a determination device that determines whether an image of a new commodity has been stored in the commodity database, and the commodity group determination device determines the group of commodities to be transmitted to the terminal apparatus among the commodities stored in the commodity database if the determination device determines that an image of a new commodity has been stored.

According to the image display system of the second aspect, the server apparatus determines whether an image of a new commodity has been stored in the commodity database. If an image of a new commodity has been stored in the commodity database, the server apparatus determines the group of commodities to be transmitted to the terminal apparatus among the commodities stored in the commodity database. Therefore, the storage of the image of the new commodity in the commodity database can trigger the transmission of the commodity images to the terminal apparatus.

An image display system according to a third aspect of the present invention is the image display system according to the first or second aspect, wherein the terminal apparatus further includes a request transmission device that requests data transmission from the server apparatus, the server apparatus further includes a request reception device that receives the data transmission request transmitted from the request transmission device, and the commodity group determination device determines the group of commodities to be transmitted to the terminal apparatus among the commodities stored in the commodity database in response to the request reception device receiving the data transmission request.

According to the image display system of the third aspect, the server apparatus determines the group of commodities among the commodities stored in the commodity database in response to receiving the data transmission request transmitted from the terminal apparatus. Therefore, the commodity images can be transmitted to the terminal apparatus as requested by the terminal apparatus.

An image display system according to a fourth aspect of the present invention is the image display system according to any of the first to third aspects, wherein the terminal apparatus further includes a customer information transmission device that transmits information about a customer having the terminal apparatus, and the server apparatus further includes: a customer information reception device that receives the information about the customer transmitted by the customer information transmission device; and a customer database that stores the information about the customer received by the customer information reception device and a purchase history of a commodity purchased by the customer, in association with each other, wherein the commodity group determination device determines the group of commodities to be transmitted to the terminal apparatus among the commodities stored in the commodity database based on the commodity purchase history stored in the customer database.

According to the image display system of the fourth aspect, the server apparatus includes the customer database that stores the information about the customer and the purchase history of the commodity purchased by the customer, in association with each other. The server apparatus determines the group of commodities to be transmitted to the terminal apparatus among the commodities stored in the commodity database based on the information about the customer transmitted from the terminal apparatus and the purchase history stored in the customer database. Therefore, the commodities that tend to be selected by the user can be easily and reliably narrowed down.

An image display system according to a fifth aspect is the image display system according to the fourth aspect, wherein the customer database stores detailed information about the commodity purchased by the customer as the purchase history of the commodity purchased by the customer, and the commodity group determination device compares the detailed information about the commodities stored in the commodity database with the detailed information about the commodity stored in the customer database and determines, as the group of commodities, commodities associated with detailed information that substantially matches the detailed information stored in the customer database, among the commodities stored in the commodity database.

According to the image display system of the fifth aspect, the server apparatus compares the detailed information (such as tags) stored in the commodity database in association with the images of the commodities, with the detailed information stored in the customer database. The server apparatus determines, as the group of commodities, commodities associated with detailed information that substantially matches the detailed information stored in the customer database, among the commodities stored in the commodity database. Therefore, the commodities that tend to be selected by the user can be selected and recommended based on the past purchase history, as well as user properties input beforehand.

An image display system according to a sixth aspect of the present invention is the image display system according to the fourth aspect, wherein the server apparatus further comprises a feature amount calculation device that calculates a feature amount from a commodity image, the commodity database stores the image of each commodity and the feature amount calculated by the feature amount calculation device from the image of the commodity, in association with each other, the customer database stores the feature amount calculated by the feature amount calculation device from an image of the commodity purchased by the customer as the purchase history of the commodity purchased by the customer, and the commodity group determination device compares the feature amounts stored in the commodity database with the feature amount stored in the customer database and determines, as the group of commodities, commodities having feature amounts such that the difference from the feature amount stored in the customer database is substantially zero or not more than a predetermined threshold, among the commodities stored in the commodity database.

According to the image display system of the sixth aspect, the server apparatus compares the feature amounts of the images of the commodities stored in the commodity database in association with the images of the commodities with the feature amount stored in the customer database in association with information about the terminal apparatus. The server apparatus determines, as the group of commodities, commodities having feature amounts such that the difference from the feature amount stored in the customer database is substantially zero or not more than a predetermined threshold, among the commodities stored in the commodity database. Therefore, commodities can be selected by taking into account the tendency of feature amount of images, such as colors. Also, the commodities visually similar to the user's taste can be easily and reliably narrowed down by utilizing both the tags and feature amount of images.

An image display system according to a seventh aspect of the present invention is the image display system according to any of the first to sixth aspects, wherein the terminal apparatus further includes a terminal information transmission device that transmits information about the terminal apparatus, and the server apparatus further includes: a terminal information reception device that receives the information about the terminal apparatus transmitted by the terminal information transmission device; a terminal database that stores information about terminal apparatuses; and a number determination device that determines the number of commodity images capable of being transmitted to the terminal apparatus based on the information about the terminal apparatus received by the terminal information reception device and the information about terminal apparatuses stored in the terminal database, and the server-side transmission device transmits, at a time to the terminal apparatus, images of the number determined by the number determination device as capable of being transmitted to the terminal apparatus, among the images of the group of commodities determined by the commodity group determination device.

According to the image display system of the seventh aspect, the server apparatus receives information about the terminal apparatus from the terminal apparatus. The server apparatus determines the number of commodity images capable of being transmitted to the terminal apparatus based on the received information and information about terminal apparatuses stored in the terminal database, and transmits the determined number of commodity images to the terminal apparatus. This allows the commodity images to be transmitted by taking into account the memory and the receivable size of the terminal apparatus. Therefore, while the slide show is displayed, the waiting time due to receiving new images can be reduced as much as possible.

A server apparatus according to an eighth aspect of the present invention is included in the image display system according to any of the first to seventh aspects.

A terminal apparatus according to a ninth aspect of the present invention is included in the image display system according to any of the first to seventh aspects.

A terminal apparatus according to a tenth aspect of the present invention is the terminal apparatus according to the ninth aspect, including a direction input device to which a direction instruction is input by an operator, wherein the first display control device displays the slide show by sequentially sliding the images of the commodities in the direction input by the direction input device.

According to the terminal apparatus of the tenth aspect, the images of the commodities are sequentially slid in the direction in which an instruction is input by the user. Therefore, the slide show can be displayed according to the user's instructions.

A terminal apparatus according to an eleventh aspect of the present invention is the terminal apparatus according to the tenth aspect, wherein the direction input device includes: an image-taking device that takes an image of a subject in front of the display device; a recognition device that recognizes the movement of the subject taken by the image-taking device; and a first direction determination device that identifies the direction of the movement of the subject recognized by the recognition device as the direction instruction input to the direction input device.

According to the terminal apparatus of the eleventh aspect, the movement of a subject in front of the display device taken by the image-taking device that takes an image of the subject is recognized, and the images of the commodities are sequentially slid in the direction of the movement. This allows the user to operate the terminal apparatus without touching the terminal apparatus. Therefore, displayed images can be changed even if the user is away from the terminal apparatus.

A terminal apparatus according to a twelfth aspect of the present invention is the terminal apparatus according to the tenth or eleventh aspect, wherein the direction input device includes: a vibration detection device that detects a vibration of the terminal apparatus and the direction of the vibration; and a second direction determination device that identifies the direction of the vibration of the terminal apparatus detected by the vibration detection device as the direction instruction input to the direction input device.

According to the terminal apparatus of the twelfth aspect, a vibration of the terminal apparatus and the direction of the vibration are detected to sequentially slide the images of the commodities in the detected direction of the vibration. Therefore, displayed images can be changed without efforts such as performing button operations.

According to the present invention, commodity images can be smoothly and efficiently displayed on the user's terminal without requiring the user's effort.

BRIEF DESCRIPTION OF THE DRAWINGS

FIG. 2 is an exemplary data structure of a terminal DB 29 in the image display system 1;

DETAILED DESCRIPTION OF THE PREFERRED EMBODIMENTS

First Embodiment

Figure 1:
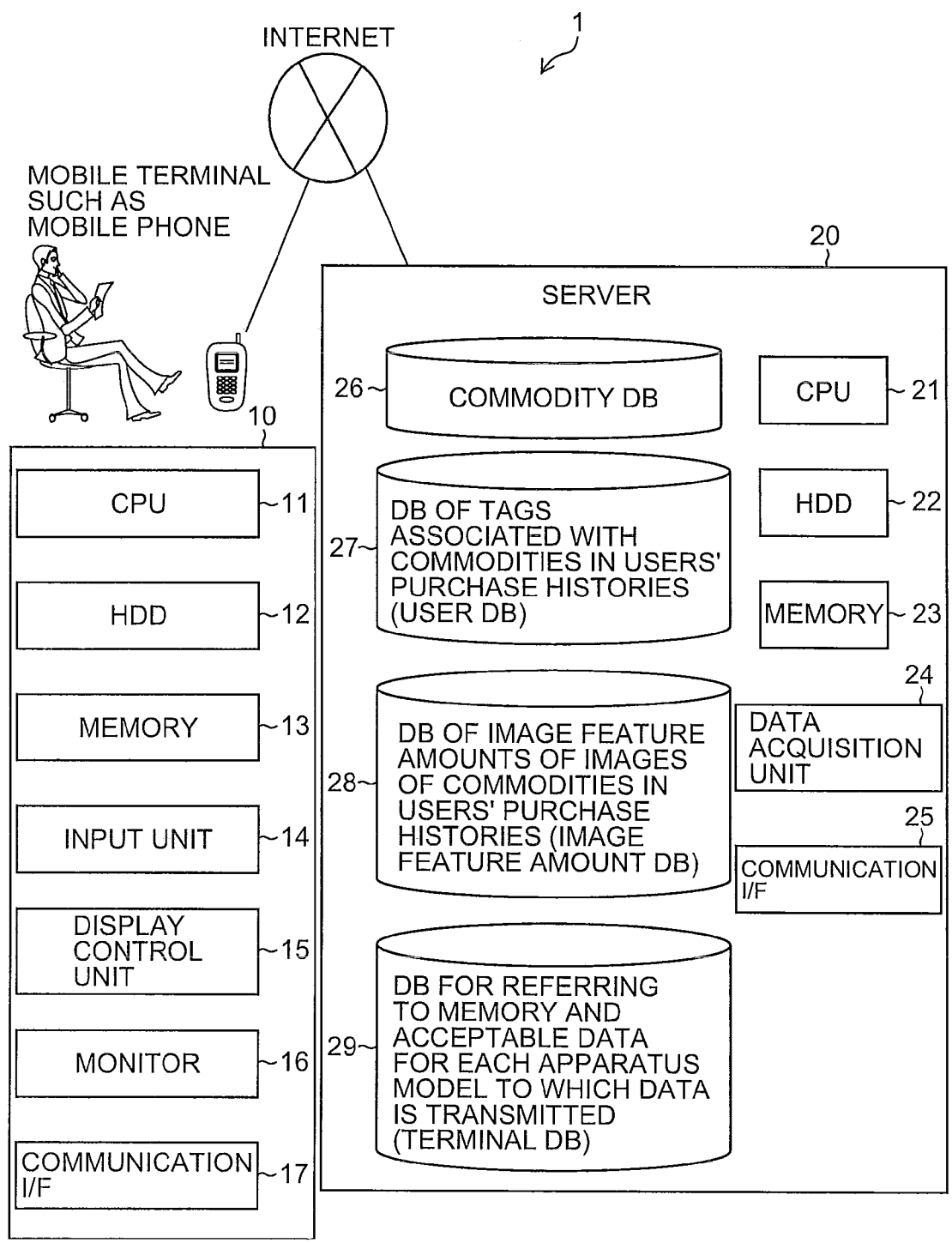
FIG. 1 is a schematic diagram of an image display system 1 in a first embodiment of the present invention.

FIG. 1 is a schematic diagram of an overall structure of an image display system 1 according to a first embodiment. The image display system 1 mainly includes a mobile terminal 10 and a server 20, which are interconnected via a line such as an Internet line.

The mobile terminal 10 is a mobile phone possessed by a user and mainly includes a CPU 11, a hard disk drive (HDD) 12, a memory 13, an input unit 14, a display control unit 15, a monitor 16, and a communication interface (communication I/F) 17. The server 20 mainly includes a CPU 21, a hard disk drive (HDD) 22, a memory 23, a data acquisition unit 24, a communication interface (communication I/F) 25, a commodity database (commodity DB) 26, a database of tags associated with commodities in users' purchase histories (user DB) 27, a database of feature amount of images of the commodities in the users' purchase histories (the feature amount of images DB) 28, and a database for referring to memory and acceptable data for each apparatus model to which data is transmitted (terminal DB) 29.

The components of the mobile terminal 10 will be described.

The CPU 11 functions as a control device generally controlling the overall operation of the mobile terminal 10 and also functions as a calculation device performing various sorts of calculation processing.

The HDD 12 stores firmware that is control programs executed by the CPU 11, various sorts of data necessary for the control, and the like.

The memory 13 is used as a working memory for the CPU 11 and as a temporary storage area for data such as image data for display.

The input unit 14 includes a keyboard, a mouse, and the like. The input unit 14 performs selection input for a commodity image displayed on the monitor 16, and input of comment text.

The display control unit 15 controls display on the monitor 16 under instructions from the CPU 11. That is, the display control unit 15 converts input data into video signals (e.g., NTSC signals, PAL signals, or SCAM signals) for display on the monitor 16 and outputs the signals to the monitor 16.

The monitor 16 is a liquid crystal display capable of color display.

The communication I/F 17 acquires information output from the server 20 and outputs the information to the CPU 11 or other components.

The components of the server 20 will be described.

The CPU 21 functions as a control device generally controlling the overall operation of the server 20 and also functions as a calculation device performing various sorts of calculation processing.

The CPU 21 calculates feature amount of images from an image of a commodity. The term "feature amount of images" here is index which indicates the color, figure such as places of edge etc. of images, for example. As feature amount of images, RGB histograms normalized so as not to be affected by the image size and the like (normalized RGB histograms) are used, for example. The feature amount is calculated for values from 0 to 255 of each of R, G, and B. That is, the feature amount consists of 256 (0 to 255)×3 types (R, G, and B)=768 values.

The HDD 22 stores firmware that is control programs executed by the CPU 21, various sorts of data necessary for the control, and the like.

The memory 23 is used as a working memory for the CPU 21.

The data acquisition unit 24 refers to the content of the user DB 27, the feature amount of images DB 28, and the terminal DB 29 to acquire, from the commodity DB 26, data to be transmitted to the mobile terminal 10. The way in which the data acquisition unit 24 determines data to be transmitted to the mobile terminal 10 will be described in detail later.

The communication I/F 25 acquires data such as an evaluation value output from the mobile terminal 10. The communication I/F 25 also outputs data output from components such as the data acquisition unit 24 to the mobile terminal 10.

Next, the various databases (the commodity DB 26, the user DB 27, the feature amount of images DB 28, and the terminal DB 29) included in the server 20 will be described. Although these databases are included in the server 20 in this embodiment, these databases may be connected to the server 20 over a network.

The commodity DB 26 stores the name of each commodity, an image of the commodity (a commodity image), a tag, feature amount of images of the commodity image, detailed information about the commodity, and the like, in association with each other. The tag is selected from a plurality of preset common names such as "T-shirt," "jeans," "passenger car," "sneakers," and "flower," for example.

The user DB 27 stores user information such as the name of each user, commodity information such as the name and price of a commodity purchased by the user in the past, and a tag associated with the commodity. The user DB 27 is updated as a user purchases a commodity, i.e., as purchase information is transmitted from the mobile terminal 10 to the server 20.

The feature amount of images DB 28 stores user information, the name of the commodity purchased by each user in the past, and feature amount of images of a commodity image. The feature amount of images DB 28 is updated as a user purchases a commodity, i.e., as purchase information is transmitted from the mobile terminal 10 to the server 20.

As shown in FIG. 2, the terminal DB 29 stores spec information such as the model name of each apparatus model to which data is transmitted, the number of pixels of a display unit, the number of colors of the display unit, and memory, as well as the data size capable of being held by an application of each mobile terminal, in association with each other.

Figure 3:
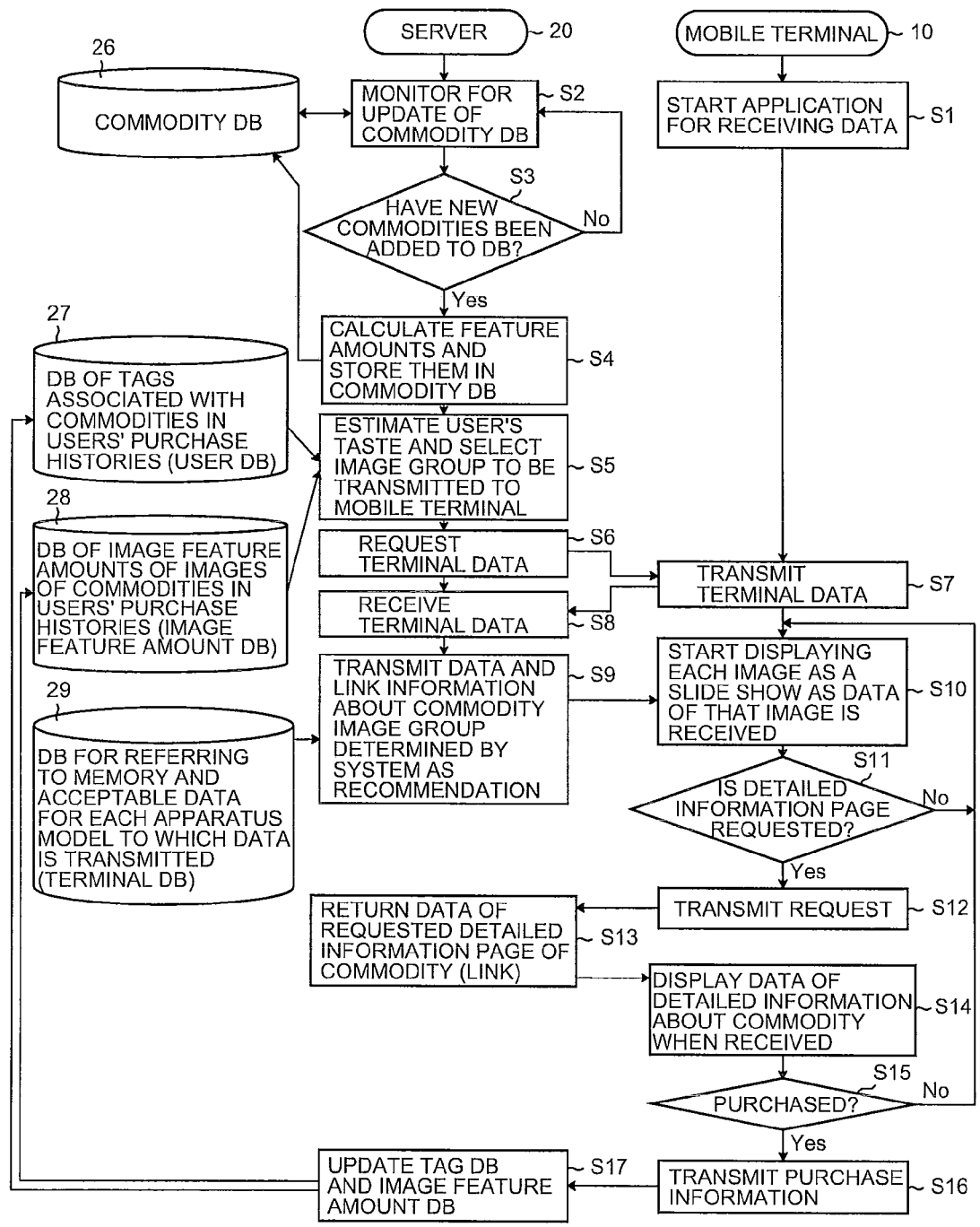
FIG. 3 is a flowchart showing a process flow in the image display system 1.

The operation of the image display system 1 configured as above will be described. FIG. 3 is a flowchart showing an overall process flow in the image display system 1.

First, the CPU 11 starts beforehand an application capable of playing video and a slide show (step S1). As an application for receiving data, an application specifically designed for the mobile terminal 10 may be used, or various known applications such as Flash may be used.

The CPU 21 monitors for addition of new commodities to the commodity DB 26. That is, the CPU 21 monitors whether or not commodity names, commodity images, tags, and detailed information have been newly stored in the commodity DB 26 (step S2) and determines whether commodities have been added (step S3). If no commodities have been added (NO in step S3), step S2 is repeated.

If commodities have been added (YES in step S3), the CPU 21 calculates feature amount of images from each commodity image newly stored in the commodity DB 26 and stores the calculated image feature amount in the commodity DB 26 in association with the commodity name and the like corresponding to feature amount of images (step S4). Thus, the commodity DB 26 is updated.

Based on a tag stored in the user DB 27, the data acquisition unit 24 selects commodities from the commodities stored in the commodity DB 26. That is, the data acquisition unit 24 compares the tags stored in the commodity DB 26 with the tag stored in the user DB 27 and selects commodities having the same tag as stored in the user DB 27.

The data acquisition unit 24 also calculates the degree of similarity by performing subtraction between the values of each of R, G, and B of feature amount of images stored in the feature amount of images DB 28 and the values of each of R, G, and B of feature amount of images associated with each commodity selected based on the tag and by summing the differences. The data acquisition unit 24 selects commodities having degrees of similarity equal to or lower than a predetermined threshold as commodities to be transmitted to the mobile terminal 10, and acquires commodity images of the commodities and link information about the commodities (e.g., URLs for detailed information stored in the commodity DB 26 about the commodities) from the commodity DB 26 (step S5).

The way of calculating the degree of similarity will be described with respect to an example of calculating the degree of similarity between the feature amount of an image A and the feature amount of an image B. First, processing of calculating the difference between the feature amount of 0 of R of the image A and the feature amount of 0 of R of the image B, the difference between the feature amount of 1 of R of the image A and the feature amount of 1 of R of the image B, and so on is performed for 0 to 255 of R. The sum of the differences is calculated as the degree of similarity for R. Similar processing is performed for G and B to calculate the degrees of similarity for G and B. Finally, the degrees of similarity for R, G, and B are added up to calculate the degree of similarity between the feature amount of the image A and the feature amount of the image B. The degree of similarity may be calculated not only by the above method, but also by considering each histogram of R, G, and B as a feature amount vector and determining Euclidean distances or Mahalanobis distances.

Thus, the commodities with visual tendencies similar to the commodity purchased by the user in the past can be automatically extracted. The commodity images and link information acquired from the commodity DB 26 are temporarily stored in the memory 23.

The CPU 21 transmits a transmission request to the mobile terminal 10 via the communication I/F 25 for information about the terminal (the model name, user properties such as the user name, etc.) (step S6). The CPU 11 receives the transmission request via the communication I/F 17 and transmits the information about the terminal to the server 20 via the communication I/F 17 (step S7).

The CPU 21 receives the information about the mobile terminal 10 via the communication I/F 25 (step S8). The CPU 21 compares the received information (e.g., the model name) with the information stored in the terminal DB 29 (the table shown in FIG. 2) to determine the data size capable of being transmitted at a time to the mobile terminal 10. The CPU 21 also acquires the determined data size's worth of commodity images and link information in ascending order of degree of similarity from the commodity images and link information acquired and stored in the memory in step S5. The CPU 21 transmits the acquired commodity images and link information to the mobile terminal 10 via the communication I/F 25 (step S9).

Figure 4:
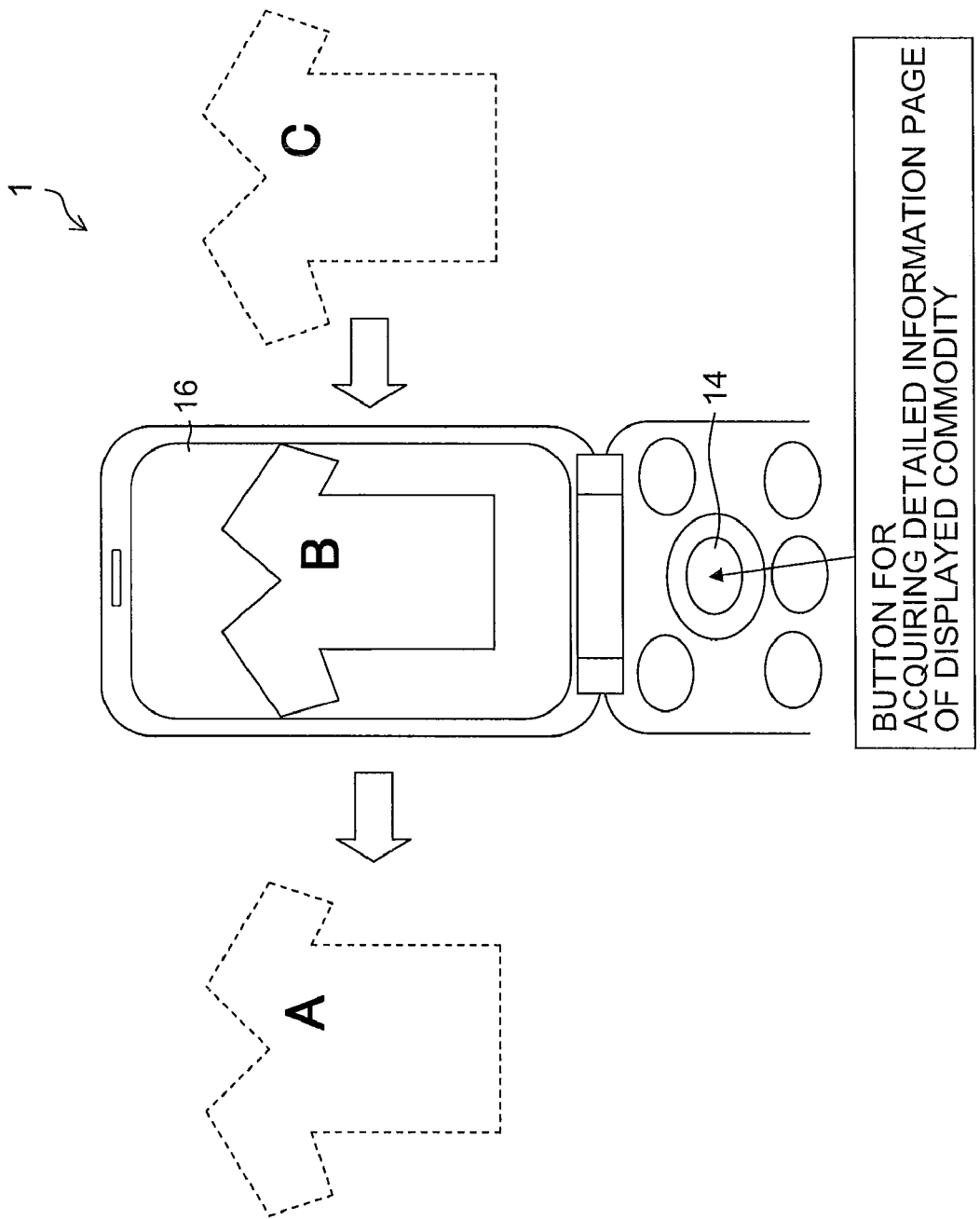
FIG. 4 is exemplary slide show display in the image display system 1.

The CPU 11 receives the commodity images and link information via the communication I/F 17 and displays the commodity images as a slide show on the monitor 16 via the display control unit 15 (step S10). FIG. 4 is a diagram showing an exemplary display form of the commodity images. The display control unit 15 generates display image data for each commodity image, and the CPU 11 outputs the image data generated by the display control unit 15 to the monitor 16 for each commodity image. As a result, only one commodity image is displayed on the entire monitor 16. The CPU 11 outputs the generated image data to the monitor 16 at certain time intervals. Since the application capable of playing a slide show has been started beforehand in step S1, the image data output to the monitor 16 at the certain time intervals is switched and displayed every time new image data is output after the lapse of the certain time. Thus, as shown in FIG. 4, the commodity images are sequentially displayed one by one like a commodity image of A, a commodity image of B, a commodity image of C, and so on (slide show display). At this point, it is preferable to display the commodity images in ascending order of degree of similarity, i.e., to sequentially display the commodity images starting with an image most similar to the image of the commodity purchased by the user in the past.

The CPU 11 determines whether selection input for a commodity image is provided (step S11). The selection input for a commodity image is provided by the user pressing the input unit 14, e.g., a button for acquiring a page about details of the commodity, when the commodity image is displayed on the monitor 16.

If selection input for a commodity is not provided (NO in step S11), the slide show is continuously displayed (step S10).

If selection input for a commodity is provided, e.g., if selection input for the commodity image of B is provided when the commodity image of B is displayed on the monitor 16 as shown in FIG. 4 (YES in step S11), the CPU 11 recognizes that the commodity B is selected and transmits this information (e.g., the fact that the link information about the commodity B is selected) to the server 20 via the communication I/F 17 (step S12).

The CPU 21 receives the selection of the commodity B via the communication I/F 25, acquires the detailed information about the commodity B from the commodity DB 26, and transmits the detailed information to the mobile terminal 10 via the communication I/F 25 (step S13). The CPU 11 receives the detailed information via the communication I/F 17 and outputs the received detailed information to the monitor 16 via the display control unit 15 (step S14). Thus, the detailed information is displayed on the monitor 16.

The CPU 11 determines whether the commodity with the detailed information received is purchased (step S15). Whether the commodity is purchased is determined based on whether selection input for the detailed information is provided when the detailed information is displayed on the monitor 16.

If the commodity is not purchased (NO in step S15), the slide show is continuously displayed (step S10).

If the commodity is purchased (YES in step S15), the CPU 11 transmits purchase information, including commodity information such as the name of the purchased commodity and user information about the user who purchases the commodity, to the server 20 via the communication I/F 17 (step S16).

The CPU 21 receives the purchase information via the communication I/F 25. The CPU 21 stores the commodity information such as the received commodity name in the user DB 27 in association with the user information, and stores feature amount of images of the commodity image associated with the received commodity name in the feature amount of images DB 28 in association with the user information (step S17). As feature amount of images to be used for updating the feature amount of images DB 28, feature amount of images stored in association with the received commodity name may be acquired from the feature amount of images DB 28 and used, or in a case where the commodity image is received, feature amount of images may be calculated from the commodity image and used. Thus, the user DB 27 and the feature amount of images DB 28 are updated, so that the step of selecting the commodities (step S5) will be performed based on the updated user DB 27 and image feature amount DB 28 from the next time on.

According to this embodiment, the visual images of the commodities can be easily displayed without going through a process of accessing a commodity information page after an act such as reading e-mail, and without the user performing special operations. Therefore, the commodity information can be provided to the user without imposing burden on the user.

Also according to this embodiment, extra information such as text does not need to be displayed. Therefore, the appeal of the commodities for which visual recognition is important can be directly conveyed to the user.

Also according to this embodiment, the tag and feature amount of images are used to provide the commodity images. Therefore, the commodities visually similar to the user's taste can be easily and reliably narrowed down.

Also according to this embodiment, the commodity images are transmitted by taking into account the memory and receivable size of the mobile terminal. Therefore, while the slide show is displayed, the waiting time due to receiving new images can be reduced as much as possible.

In this embodiment, commodity images and link information corresponding to the data size capable of being transmitted at a time to the mobile terminal are acquired in ascending order of degree of similarity from the commodity images and link information acquired and stored in the memory in step S5. The acquired commodity images and link information are then transmitted to the mobile terminal 10 (Step S9), and the transmitted link information are then transmitted to the mobile terminal 10 (Step S9), and the transmitted commodity images are sequentially displayed as a slide show (step S10). However, it is also possible to, each time images are slid, repeat processing of requesting transmission of commodity images corresponding to the amount of sliding and displaying the commodity images as a slide show. In this case, all the commodity images acquired in step S5 can be displayed as the slide show on the monitor 16.

Also in this embodiment, the application is started beforehand in the mobile terminal, and the addition of the commodities to the commodity DB triggers the processing of steps S5 to S17. However, an instruction may be output from the mobile terminal to the server 20 so that the instruction triggers the processing of steps S5 to S17.

Also in this embodiment, an implementation has been illustrated in which the application is started to display the slide show. However, the commodity images may be displayed in a form like a screen saver.

Figure 5:
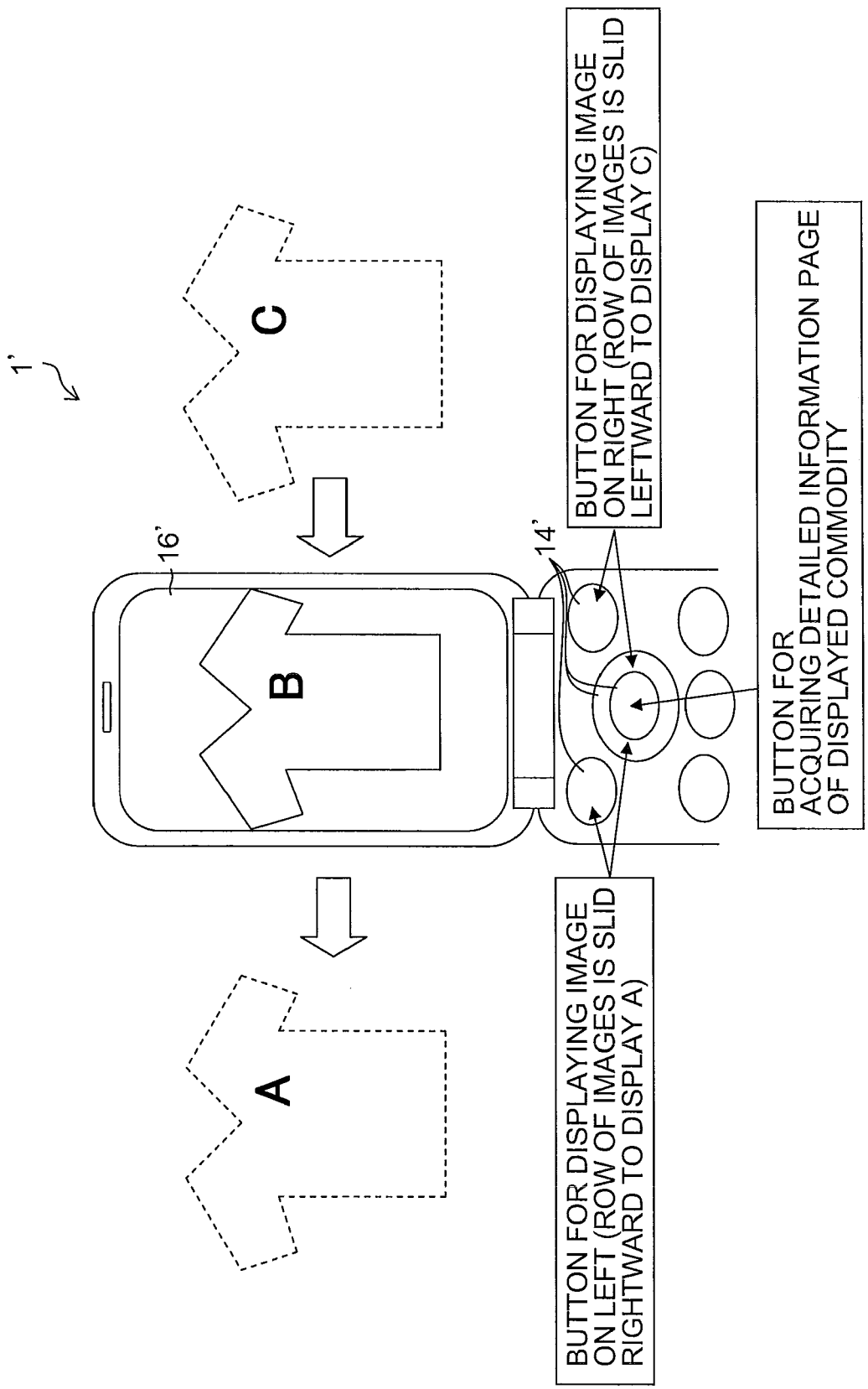
FIG. 5 is exemplary slide show display in an image display system 1'.

Also in this embodiment, the slide show is displayed such that the image data output to the monitor 16 at the certain time intervals is switched and displayed upon each lapse of the certain time. However, as shown in FIG. 5, the slide show may be displayed according to the user's instructions.

An input unit 14' includes buttons such as a button for acquiring detailed information about a commodity whose commodity image is being displayed, a button for displaying an image on the left, and a button for displaying an image on the right. The CPU 21 receives the commodity images from the server 20 and displays a commodity image with the lowest degree of similarity, i.e., an image most similar to the image of the commodity purchased by the user in the past (e.g., the commodity image of the commodity A) on the monitor 16. If the CPU 21 determines that the user presses the button for displaying an image on the right, the CPU 21 slides the commodity image of the commodity A to the left and displays a commodity image with the second lowest degree of similarity (e.g., the commodity image of the commodity B) on the monitor 16.

If the CPU 21 determines that the user presses the button for displaying an image on the right while the commodity image of the commodity B is displayed on the monitor 16, the CPU 21 slides the commodity image of the commodity B to the left and displays a commodity image with the third lowest degree of similarity (e.g., the commodity image of the commodity C) on the monitor 16. If the CPU 21 determines that the user presses the button for displaying an image on the left while the commodity image of the commodity B is displayed on the monitor 16, the CPU 21 slides the commodity image of the commodity B to the right and displays the commodity image of the commodity A with the lowest degree of similarity on the monitor 16.

If the CPU 21 determines that the user presses the button for displaying an image on the left while the commodity image of the commodity A is displayed on the monitor 16, the CPU 21 slides the commodity image of the commodity A to the right and displays a commodity image with the highest degree of similarity on the monitor 16 among the commodity images transmitted to the mobile terminal 10.

Thus, the slide show can be displayed according to the user's instructions.

Second Embodiment

A second embodiment involves the use of a touch panel as a device for the user to input instructions, so that a slide show is displayed according to instructions input by the user through the touch panel. An image display system 2 in the second embodiment will be described below. Like parts as in the first embodiment are given like numerals and will not be described in detail.

Figure 6:
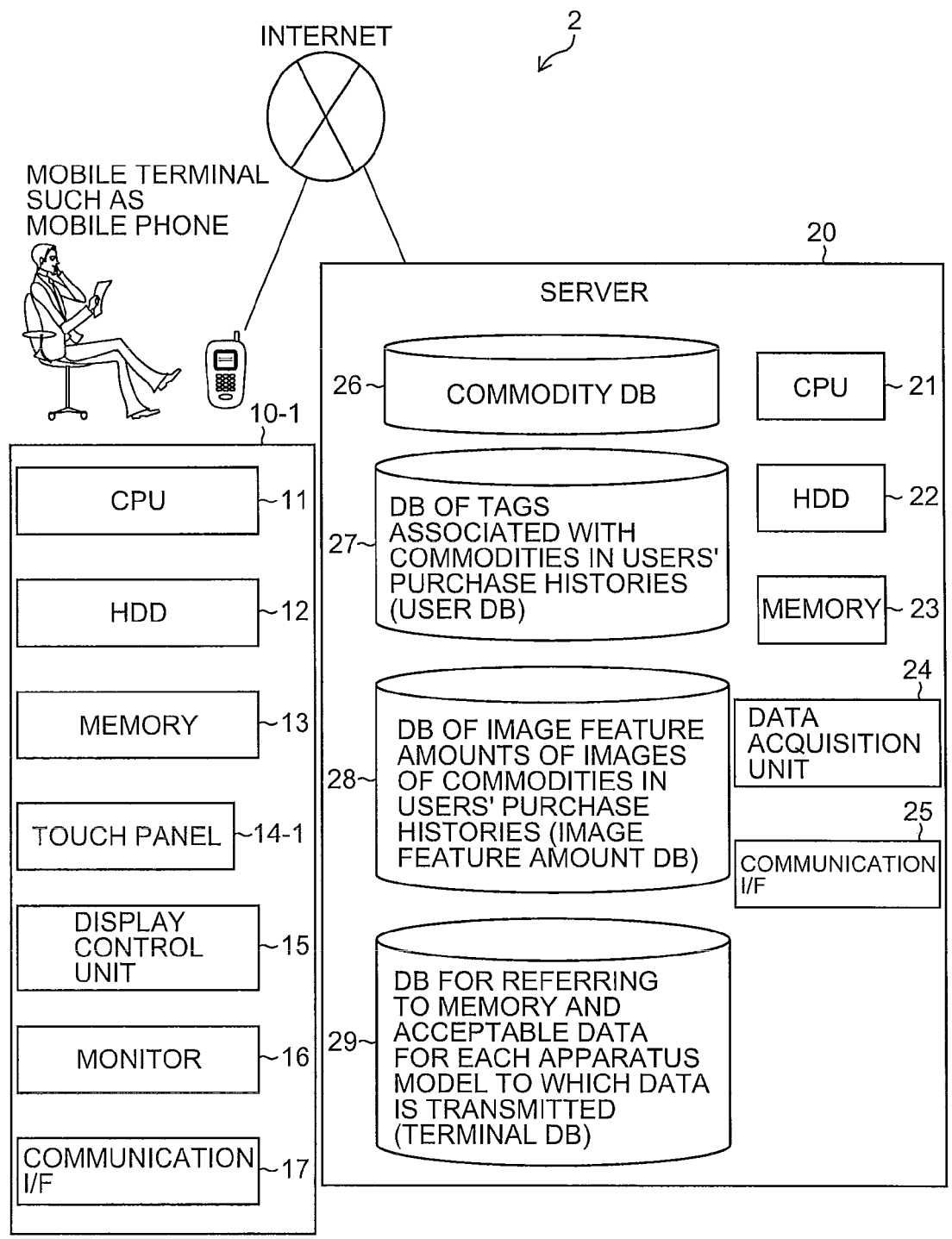
FIG. 6 is a schematic diagram of an image display system 2 in a second embodiment of the present invention.

As shown in FIG. 6, the image display system 2 mainly includes a mobile terminal 10-1 and a server 20, which are interconnected via a line such as an Internet line. The mobile terminal 10-1 is a mobile phone possessed by the user and mainly includes a CPU 11, a hard disk drive (HDD) 12, a memory 13, a touch panel 14-1, a display control unit 15, a monitor 16, and a communication interface (communication I/F) 17.

The touch panel 14-1 is almost the same in size as the monitor 16 and disposed in front of the monitor 16. The touch panel 14-1 is an analog resistive film touch panel with two members (mainly films or glass) combined together in such a manner that transparent conductive films (ITO) formed on one side of the members are opposed to each other across a predetermined distance. When the touch panel is pressed by a finger or a pen, the transparent conductive films come into contact with each other to cause a signal to be input.

Figure 7:
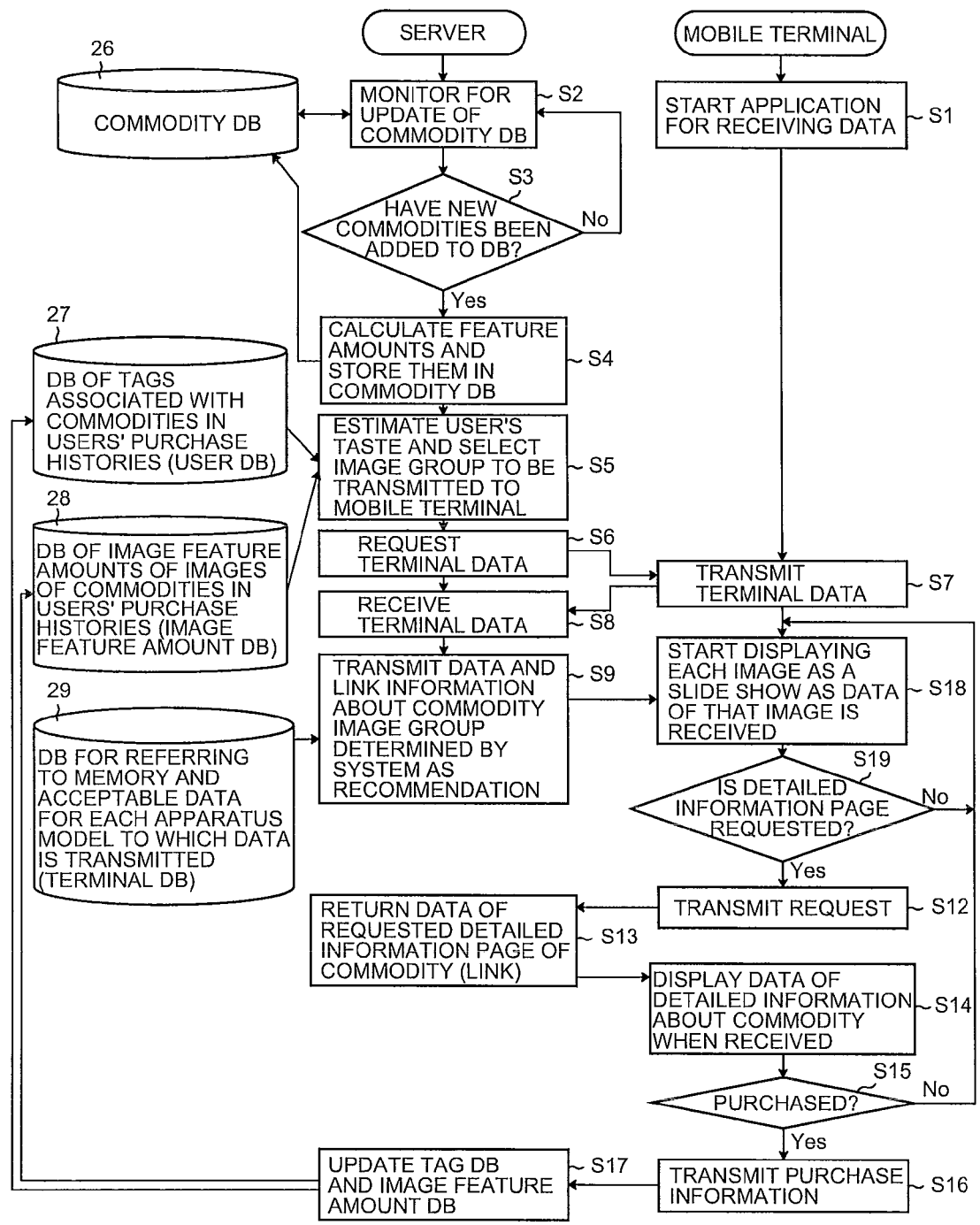
FIG. 7 is a flowchart showing a process flow in the image display system 2.

The operation of the image display system 2 configured as above will be described. FIG. 7 is a flowchart showing an overall process flow in the image display system 2.

First, the CPU 11 starts beforehand an application capable of playing video and a slide show (step S1).

The CPU 21 monitors for addition of new commodities to the commodity DB 26 (step S2) to determine whether commodities have been added (step S3). If no commodities have been added (NO in step S3), step S2 is repeated.

If commodities have been added (YES in step S3), the CPU 21 calculates feature amount of images from each commodity image newly stored in the commodity DB 26 and stores the calculated image feature amount in the commodity DB 26 in association with the commodity name and the like corresponding to feature amount of images (step S4). Thus, the commodity DB 26 is updated.

Based on a tag stored in the user DB 27, the data acquisition unit 24 selects commodities from the commodities stored in the commodity DB. The data acquisition unit 24 also calculates the degree of similarity by performing subtraction between the values of each of R, G, and B of feature amount of images stored in the feature amount of images DB 28 and the values of each of R, G, and B of feature amount of images associated with each commodity selected based on the tag and by summing the differences. The data acquisition unit 24 selects commodities having degrees of similarity equal to or lower than a predetermined threshold as commodities to be transmitted to the mobile terminal 10-1, and acquires commodity images of the commodities and link information about the commodities (e.g., URLs for detailed information stored in the commodity DB 26 about the commodities) from the commodity DB 26 (step S5). Thus, the commodities with visual tendencies similar to the commodity purchased by the user in the past can be automatically extracted. The commodity images and link information acquired from the commodity DB 26 are temporarily stored in the memory 23.

The CPU 21 transmits a transmission request to the mobile terminal 10-1 via the communication I/F 25 for information about the terminal (the model name, user name, etc.) (step S6). The CPU 11 receives the transmission request via the communication I/F 17 and transmits the information about the terminal to the server 20 via the communication I/F 17 (step S7).

The CPU 21 receives the information about the mobile terminal 10-1 via the communication I/F 25 (step S8). The CPU 21 compares the received information (e.g., the model name) with the information stored in the terminal DB 29 (the table shown in FIG. 2) to determine the data size capable of being transmitted at a time to the mobile terminal 10-1. The CPU 21 also acquires the determined data size's worth of commodity images and link information in ascending order of degree of similarity from the commodity images and link information acquired and stored in the memory in step S5. The CPU 21 transmits the acquired commodity images and link information to the mobile terminal 10-1 via the communication I/F 25 (step S9).

Figure 8:
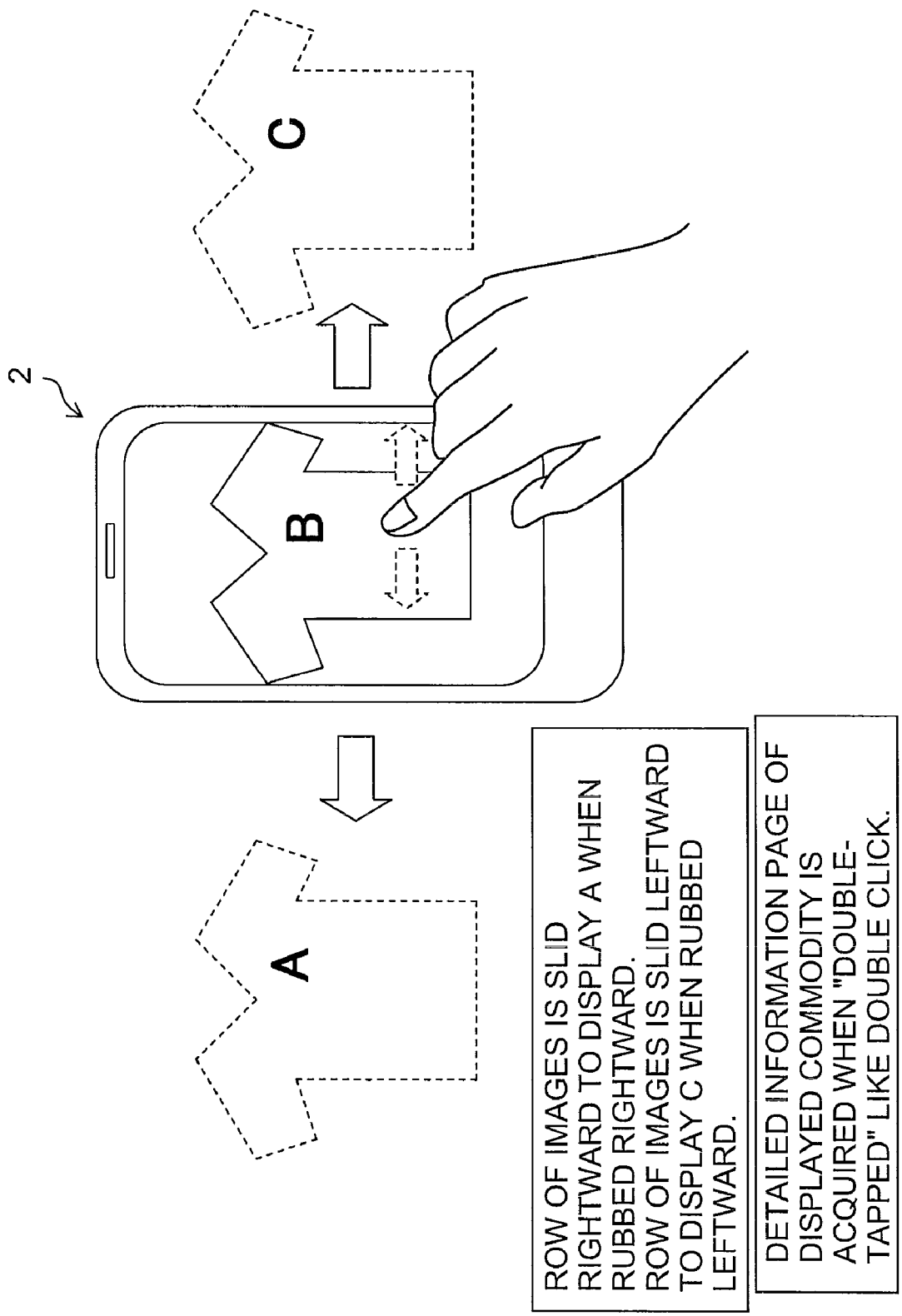
FIG. 8 is exemplary slide show display in the image display system 2.

The CPU 11 receives the commodity images and link information via the communication I/F 17 and displays the commodity images as a slide show on the monitor 16 via the display control unit 15 (step S18). FIG. 8 is a diagram showing an exemplary display form of the commodity images. The display control unit 15 generates display image data for each commodity image. The CPU 21 outputs the image data of an image with the lowest degree of similarity to the monitor 16 via the display control unit 15. As a result, only one commodity image with the lowest degree of similarity (e.g., the commodity image of the commodity A) is displayed on the entire monitor 16.

If the CPU 21 determines that input for moving leftward is provided on the touch panel 14-1, i.e., that the user rubs the touch panel 14-1 leftward with the user's finger or the like, the CPU 21 slides the commodity image of the commodity A to the left and displays a commodity image with the second lowest degree of similarity (e.g., the commodity image of the commodity B) on the monitor 16.

While the commodity image of the commodity B is displayed on the monitor 16, if the CPU 21 determines that input for moving leftward is provided on the touch panel 14-1, i.e., that the user rubs the touch panel 14-1 leftward with the user's finger or the like, the CPU 21 slides the commodity image of the commodity B to the left and displays a commodity image with the third lowest degree of similarity (e.g., the commodity image of the commodity C) on the monitor 16. While the commodity image of the commodity B is displayed on the monitor 16, if the CPU 21 determines that input for moving rightward is provided on the touch panel 14-1, i.e., that the user rubs the touch panel 14-1 rightward with the user's finger or the like, the CPU 21 slides the commodity image of the commodity B to the right and displays the commodity image of the commodity A with the lowest degree of similarity on the monitor 16.

While the commodity image of the commodity A is displayed on the monitor 16, if the CPU 21 determines that input for moving rightward is provided on the touch panel 14-1, i.e., that the user rubs the touch panel 14-1 rightward with the user's finger or the like, the CPU 21 slides the commodity image of the commodity A to the right and displays a commodity image with the highest degree of similarity on the monitor 16 among the commodity images transmitted to the mobile terminal 10-1.

Thus, the commodity images are displayed as a slide show. The CPU 11 determines whether selection input for a commodity image is provided (step S19). The selection input for a commodity image is provided by the user pressing twice, i.e., double-tapping, the touch panel 14-1 when a desired commodity image is displayed on the monitor 16.

If selection input for a commodity is not provided (NO in step S19), the slide show is continuously displayed (step S18).

If selection input for a commodity is provided, e.g., if selection input for the commodity image of B is provided when the commodity image of B is displayed on the monitor 16 as shown in FIG. 8 (YES in step S19), the CPU 11 recognizes that the commodity B is selected and transmits this information (e.g., the fact that the link information about the commodity B is selected) to the server 20 via the communication I/F 17 (step S12).

The CPU 21 receives the selection of the commodity B via the communication I/F 25, acquires the detailed information about the commodity B from the commodity DB 26, and transmits the detailed information to the mobile terminal 10-1 via the communication I/F 25 (step S13). The CPU 11 receives the detailed information via the communication I/F 17 and outputs the received detailed information to the monitor 16 via the display control unit 15 (step S14). Thus, the detailed information is displayed on the monitor 16.

The CPU 11 determines whether the commodity with the detailed information received is purchased (step S15). If the commodity is not purchased (NO in step S15), the slide show is continuously displayed (step S18).

If the commodity is purchased (YES in step S15), the CPU 11 transmits purchase information, including commodity information such as the name of the purchased commodity and user information about the user who purchases the commodity, to the server 20 via the communication I/F 17 (step S16).

The CPU 21 receives the purchase information via the communication I/F 25. The CPU 21 stores the commodity information such as the received commodity name in the user DB 27 in association with the user information, and stores feature amount of images of the commodity image associated with the received commodity name in the feature amount of images DB 28 in association with the user information (step S17).

According to this embodiment, the slide show can be displayed according to the user's instructions with simple and visual-based operations.

Third Embodiment

A third embodiment involves displaying a slide show according to the movement of a subject (e.g., the user's hand) taken by a camera. An image display system 3 in the third embodiment will be described below. Like parts as in the first or second embodiment are given like numerals and will not be described in detail.

Figure 9:
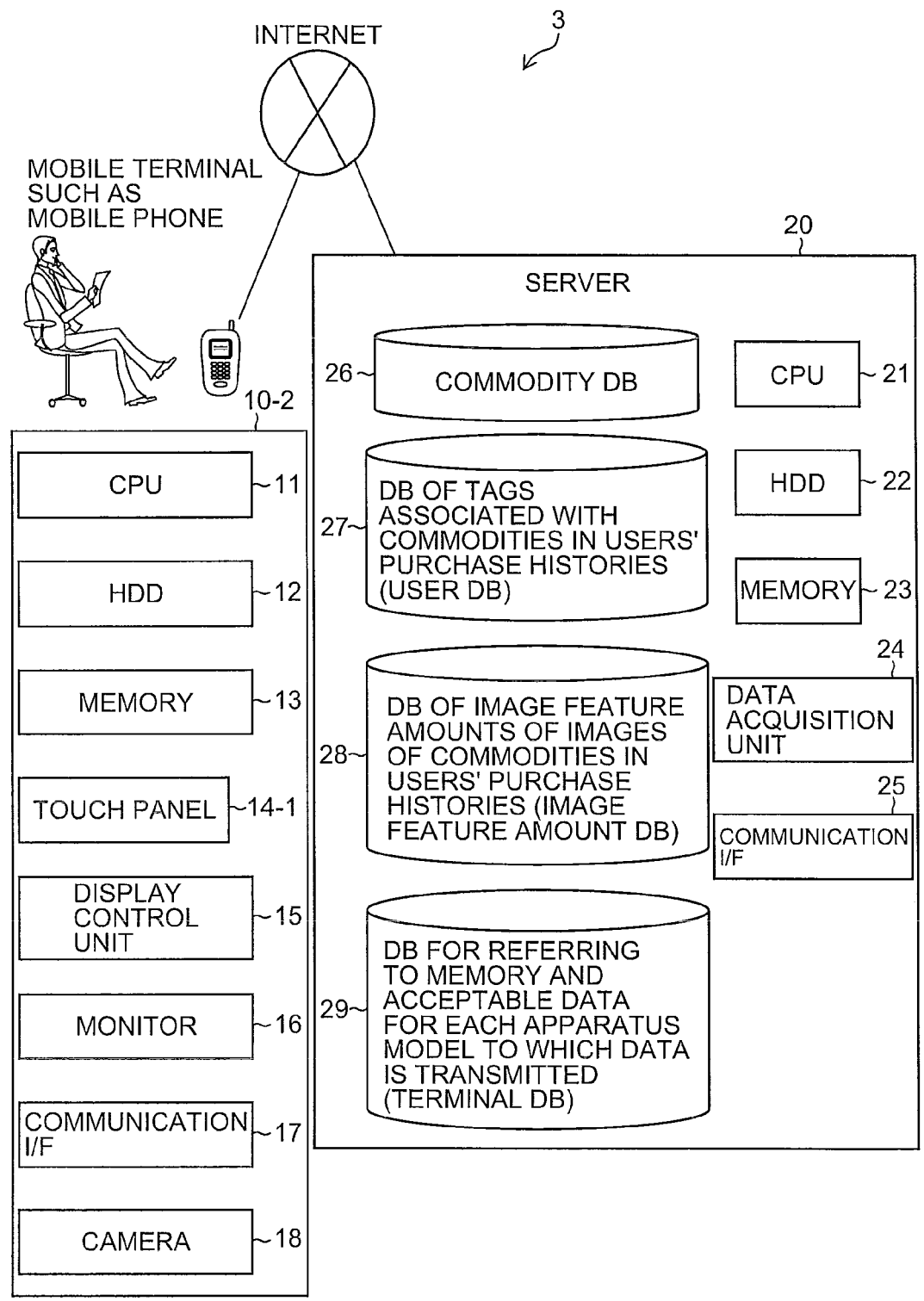
FIG. 9 is a schematic diagram of an image display system 3 in a third embodiment of the present invention.

As shown in FIG. 9, the image display system 3 mainly includes a mobile terminal 10-2 and a server 20, which are interconnected via a line such as an Internet line. The mobile terminal 10-2 is a mobile phone possessed by a user and mainly includes a CPU 11, a hard disk drive (HDD) 12, a memory 13, a touch panel 14-1, a display control unit 15, a monitor 16, a communication interface (communication I/F) 17, and a camera 18.

Figure 11:
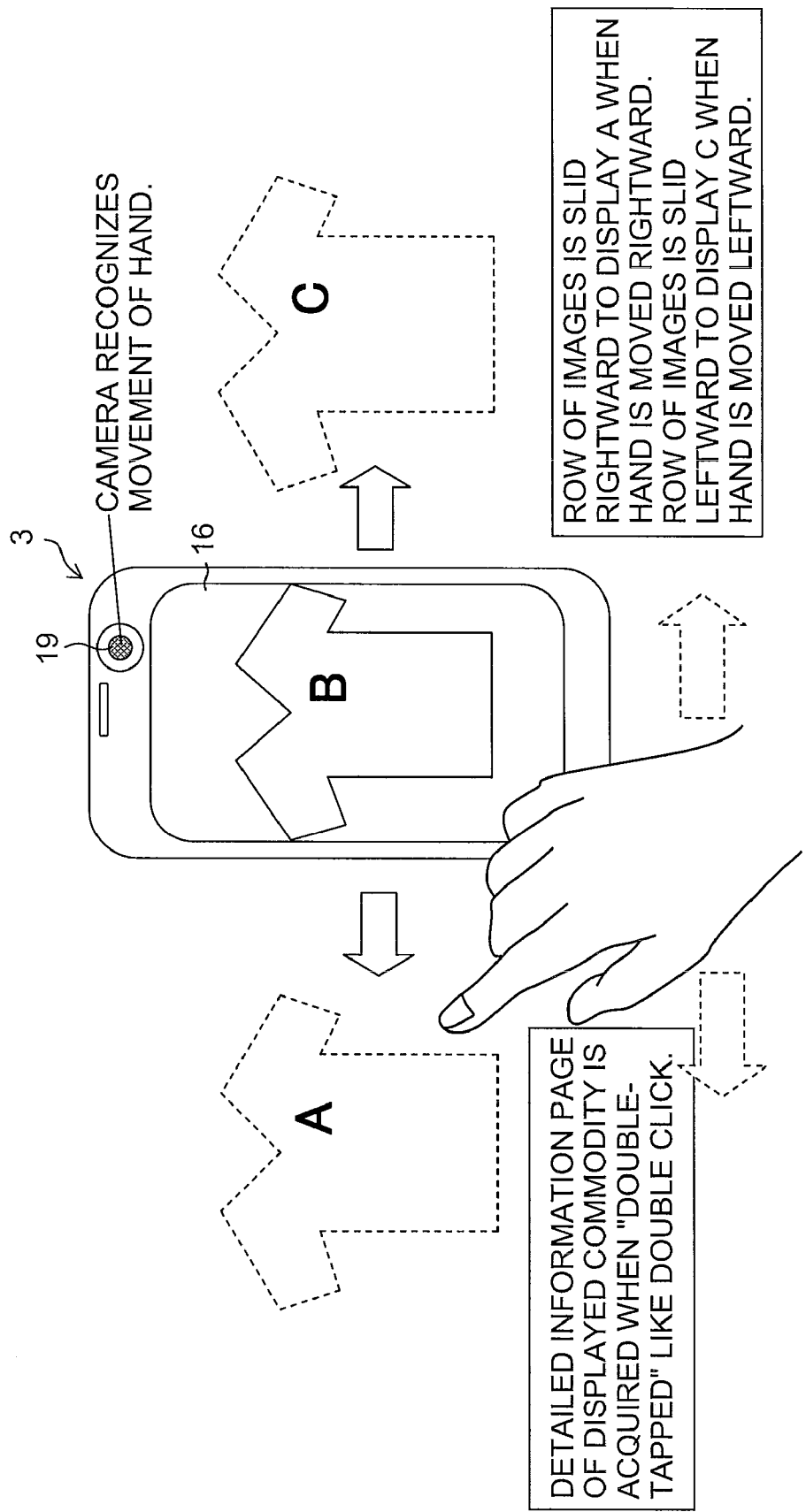
FIG. 11 is exemplary slide show display in the image display system 3.

The camera 18 can take static images, live-view images, and moving images, and is provided on the same side as the monitor 16 (see FIG. 11). This allows capturing an image of the face, hand, and the like of the user looking at the monitor 16.

The camera 18 includes a taking lens and a CCD image sensor (hereinafter referred to as a CCD), as well as an analog processing unit, A/D converter, image processing unit, and a compression and decompression unit for processing image signals obtained from the CCD. The components of the camera 18 are already well known and therefore will not be described.

Figure 10:
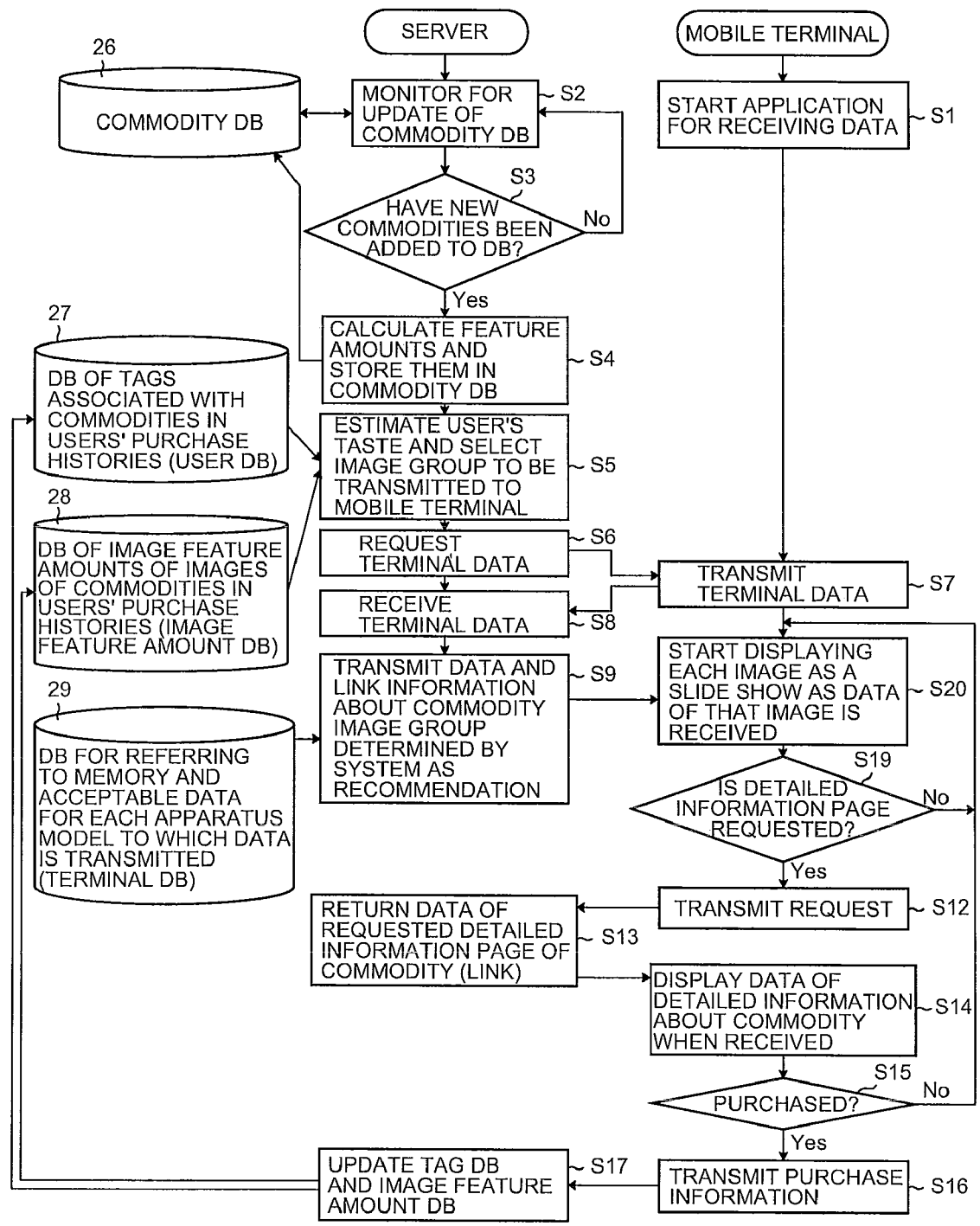
FIG. 10 is a flowchart showing a process flow in the image display system 3.

The operation of the image display system 3 configured as above will be described. FIG. 10 is a flowchart showing an overall process flow in the image display system 3.

First, the CPU 11 starts beforehand an application capable of playing video and a slide show (step S1).

The CPU 21 monitors for addition of new commodities to the commodity DB 26 (step S2) to determine whether commodities have been added (step S3). If no commodities have been added (NO in step S3), step S2 is repeated.

If commodities have been added (YES in step S3), the CPU 21 calculates feature amount of images from each commodity image newly stored in the commodity DB 26 and stores the calculated image feature amount in the commodity DB 26 in association with the commodity name and the like corresponding to feature amount of images (step S4). Thus, the commodity DB 26 is updated.

Based on a tag stored in the user DB 27, the data acquisition unit 24 selects commodities from the commodities stored in the commodity DB. The data acquisition unit 24 also calculates the degree of similarity by performing subtraction between the values of each of R, G, and B of feature amount of images stored in the feature amount of images DB 28 and the values of each of R, G, and B of feature amount of images associated with each commodity selected based on the tag and by summing the differences. The data acquisition unit 24 selects commodities having degrees of similarity equal to or lower than a predetermined threshold as commodities to be transmitted to the mobile terminal 10-2, and acquires commodity images of the commodities and link information about the commodities (e.g., URLs for detailed information stored in the commodity DB 26 about the commodities) from the commodity DB 26 (step S5). Thus, the commodities with visual tendencies similar to the commodity purchased by the user in the past can be automatically extracted. The commodity images and link information acquired from the commodity DB 26 are temporarily stored in the memory 23.

The CPU 21 transmits a transmission request to the mobile terminal 10-2 via the communication I/F 25 for information about the terminal (the model name, user name, etc.) (step S6). The CPU 11 receives the transmission request via the communication I/F 17 and transmits the information about the terminal to the server 20 via the communication I/F 17 (step S7).

The CPU 21 receives the information about the mobile terminal 10-2 via the communication I/F 25 (step S8). The CPU 21 compares the received information (e.g., the model name) with the information stored in the terminal DB 29 (the table shown in FIG. 2) to determine the data size capable of being transmitted at a time to the mobile terminal 10-2. The CPU 21 also acquires the determined data size's worth of commodity images and link information in ascending order of degree of similarity from the commodity images and link information acquired and stored in the memory in step S5. The CPU 21 transmits the acquired commodity images and link information to the mobile terminal 10-2 via the communication I/F 25 (step S9).

The CPU 11 receives the commodity images and link information via the communication I/F 17 and displays the commodity images as a slide show on the monitor 16 via the display control unit 15 (step S20). FIG. 11 is a diagram showing an exemplary display form of the commodity images. The display control unit 15 generates display image data for each commodity image. The CPU 21 outputs the image data of an image with the lowest degree of similarity to the monitor 16 via the display control unit 15. As a result, only one commodity image with the lowest degree of similarity (e.g., the commodity image of the commodity A) is displayed on the entire monitor 16.

The CPU 21 detects the movement of a moving subject, e.g., the user's hand, from live-view images taken by the camera 18. That is, the CPU 21 detects feature points of the subject (e.g., edges of the subject) from input image data of an nth frame and input image data of a frame (n−1th frame) immediately preceding the image of the nth frame, respectively. The CPU 21 compares the feature points detected from the image data of the n−1th frame with the feature points detected from the image data of the nth frame. If the positions of the same feature points do not match, it is determined that the subject is moving. Then, the moving direction of the moving subject is detected from the positional relationships between the feature points corresponding to each other.

If the CPU 21 determines that the moving subject detected from the live-view images moves leftward, i.e., that the user moves the user's hand leftward in front of the touch panel 14-1, the CPU 21 slides the commodity image of the commodity A to the left and displays a commodity image with the second lowest degree of similarity (e.g., the commodity image of the commodity B) on the monitor 16.

While the commodity image of the commodity B is displayed on the monitor 16, if the CPU 21 determines that the moving subject detected from the live-view images moves leftward, i.e., that the user moves the user's hand leftward in front of the touch panel 14-1, the CPU 21 slides the commodity image of the commodity B to the left and displays a commodity image with the third lowest degree of similarity (e.g., the commodity image of the commodity C) on the monitor 16. While the commodity image of the commodity B is displayed on the monitor 16, if the CPU 21 determines that the moving subject detected from the live-view images moves rightward, i.e., that the user moves the user's hand rightward in front of the touch panel 14-1, the CPU 21 slides the commodity image of the commodity B to the right and displays the commodity image of the commodity A with the lowest degree of similarity on the monitor 16.

While the commodity image of the commodity A is displayed on the monitor 16, if the CPU 21 determines that the moving subject detected from the live-view images moves rightward, i.e., that the user moves the user's hand rightward in front of the touch panel 14-1, the CPU 21 slides the commodity image of the commodity A to the right and displays a commodity image with the highest degree of similarity on the monitor 16 among the commodity images transmitted to the mobile terminal 10-2.

Thus, the commodity images are displayed as a slide show. The CPU 11 determines whether selection input for a commodity image is provided (step S19). The selection input for a commodity image is provided by the user pressing twice, i.e., double-tapping, the touch panel 14-1 when a desired commodity image is displayed on the monitor 16.

If selection input for a commodity is not provided (NO in step S19), the slide show is continuously displayed (step S20).

If selection input for a commodity is provided, e.g., if selection input for the commodity image of B is provided when the commodity image of B is displayed on the monitor 16 as shown in FIG. 11 (YES in step S19), the CPU 11 recognizes that the commodity B is selected and transmits this information (e.g., the fact that the link information about the commodity B is selected) to the server 20 via the communication I/F 17 (step S12).

The CPU 21 receives the selection of the commodity B via the communication I/F 25, acquires the detailed information about the commodity B from the commodity DB 26, and transmits the detailed information to the mobile terminal 10-2 via the communication I/F 25 (step S13). The CPU 11 receives the detailed information via the communication I/F 17 and outputs the received detailed information to the monitor 16 via the display control unit 15 (step S14). Thus, the detailed information is displayed on the monitor 16.

The CPU 11 determines whether the commodity with the detailed information received is purchased (step S15). If the commodity is not purchased (NO in step S15), the slide show is continuously displayed (step S20).

If the commodity is purchased (YES in step S15), the CPU 11 transmits purchase information, including commodity information such as the name of the purchased commodity and user information about the user who purchases the commodity, to the server 20 via the communication I/F 17 (step S16).

The CPU 21 receives the purchase information via the communication I/F 25. The CPU 21 stores the commodity information such as the received commodity name in the user DB 27 in association with the user information, and stores feature amount of images of the commodity image associated with the received commodity name in the feature amount of images DB 28 in association with the user information (step S17).

According to this embodiment, the terminal apparatus can be operated with intuitive operations without touching the terminal apparatus. Therefore, images of the slide show can be changed even if the user is away from the terminal apparatus.

Fourth Embodiment

A fourth embodiment involves displaying a slide show according to the movement of the mobile terminal. An image display system 4 in the fourth embodiment will be described below. Like parts as in the first or second embodiment are given like numerals and will not be described in detail.

Figure 12:
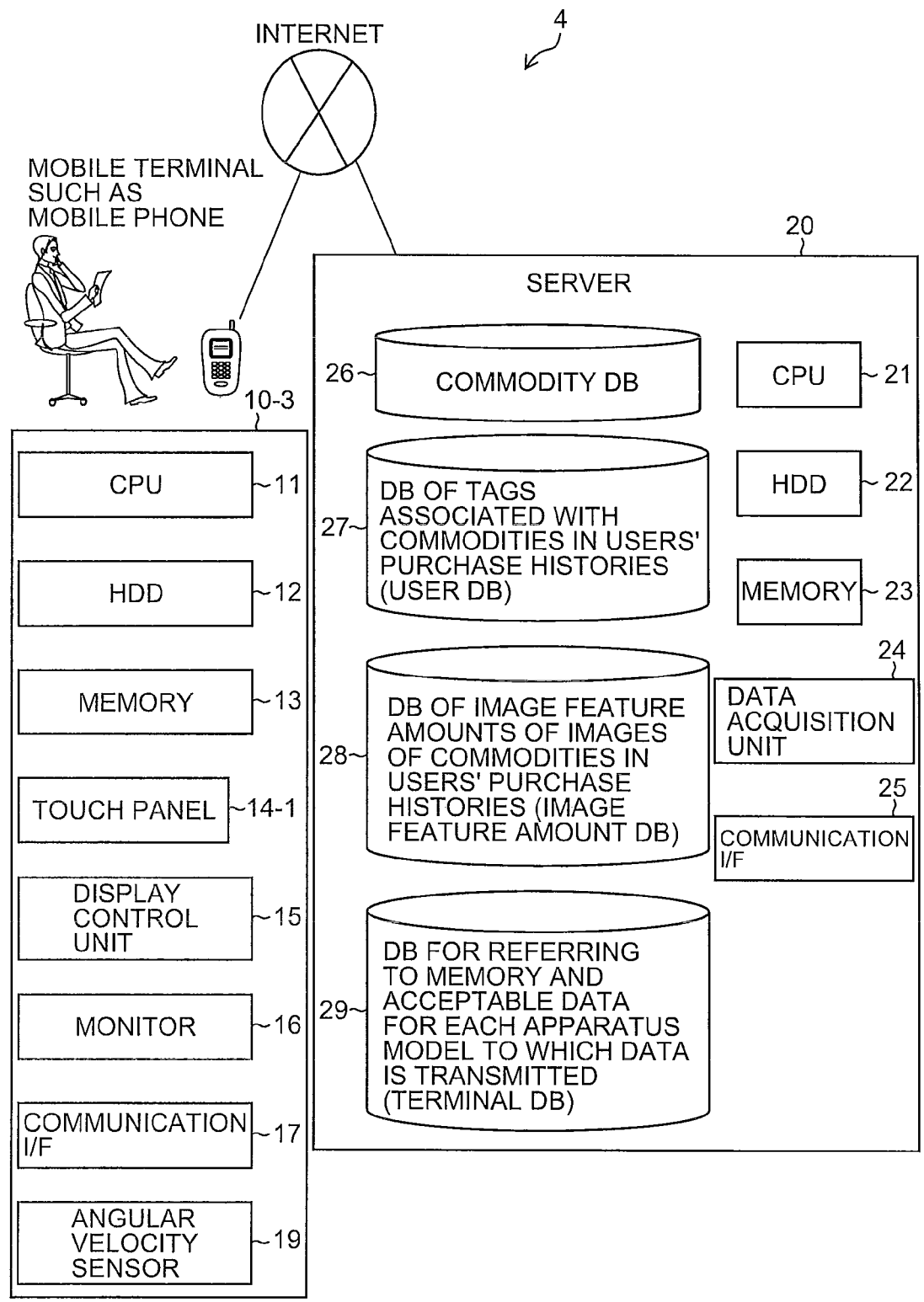
FIG. 12 is a schematic diagram of an image display system 4 in a fourth embodiment of the present invention.

As shown in FIG. 12, the image display system 4 mainly includes a mobile terminal 10-3 and a server 20, which are interconnected via a line such as an Internet line. The mobile terminal 10-3 is a mobile phone possessed by a user and mainly includes a CPU 11, a hard disk drive (HDD) 12, a memory 13, a touch panel 14-1, a display control unit 15, a monitor 16, a communication interface (communication I/F) 17, and an angular velocity sensor 19.

The angular velocity sensor 19 is a gyro sensor, for example, and detects a vibration of the mobile terminal 10-3 and its direction.

Figure 13:
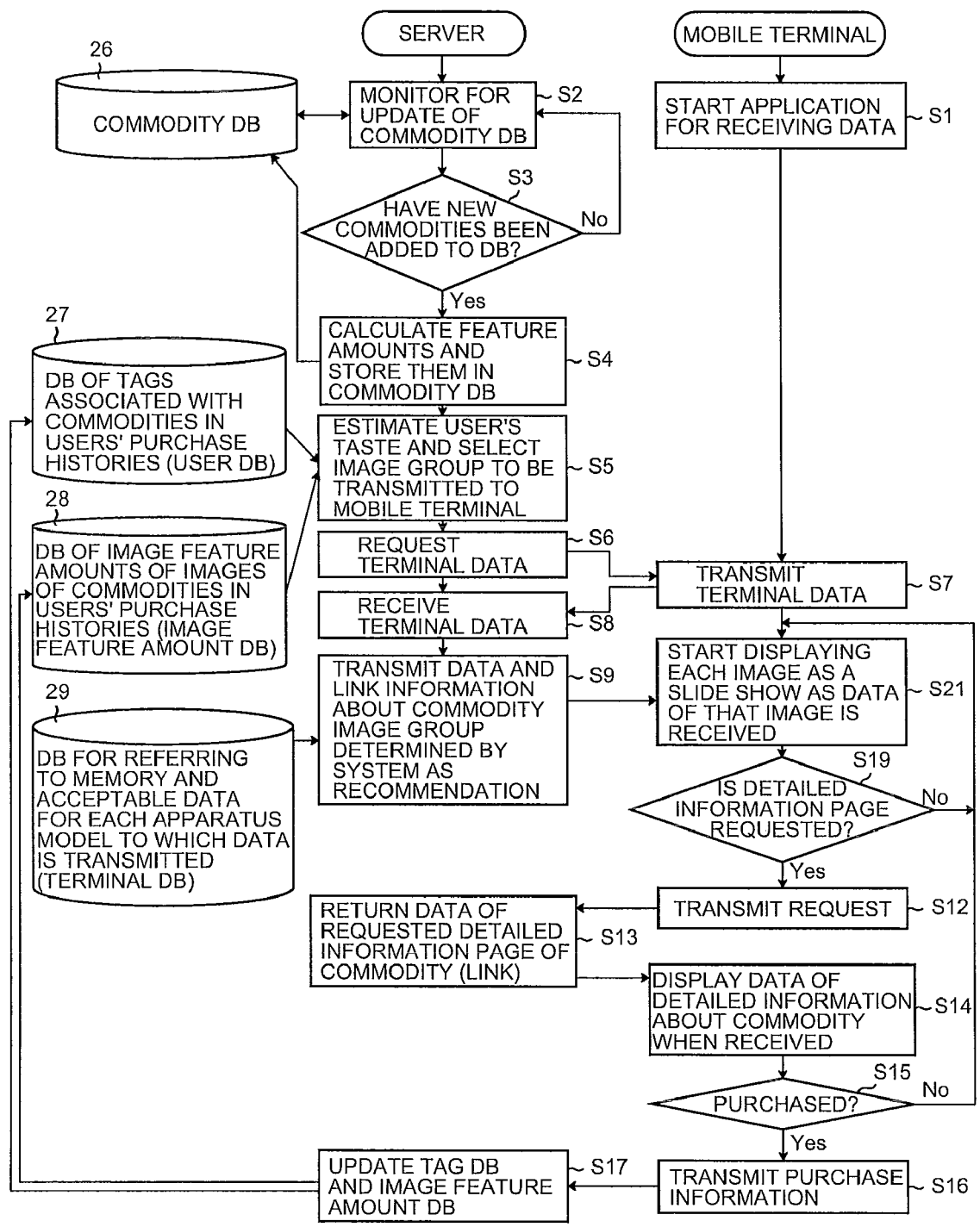
FIG. 13 is a flowchart showing a process flow in the image display system 4.

The operation of the image display system 4 configured as above will be described. FIG. 13 is a flowchart showing an overall process flow in the image display system 4.

First, the CPU 11 starts beforehand an application capable of playing video and a slide show (step S1).

The CPU 21 monitors for addition of new commodities to the commodity DB 26 (step S2) to determine whether commodities have been added (step S3). If no commodities have been added (NO in step S3), step S2 is repeated.

If commodities have been added (YES in step S3), the CPU 21 calculates feature amount of images from each commodity image newly stored in the commodity DB 26 and stores the calculated image feature amount in the commodity DB 26 in association with the commodity name and the like corresponding to feature amount of images (step S4). Thus, the commodity DB 26 is updated.

Based on a tag stored in the user DB 27, the data acquisition unit 24 selects commodities from the commodities stored in the commodity DB. The data acquisition unit 24 also calculates the degree of similarity by performing subtraction between the values of each of R, G, and B of feature amount of images stored in the feature amount of images DB 28 and the values of each of R, G, and B of feature amount of images associated with each commodity selected based on the tag and by summing the differences. The data acquisition unit 24 selects commodities having degrees of similarity equal to or lower than a predetermined threshold as commodities to be transmitted to the mobile terminal 10-3, and acquires commodity images of the commodities and link information about the commodities (e.g., URLs for detailed information stored in the commodity DB 26 about the commodities) from the commodity DB 26 (step S5). Thus, the commodities with visual tendencies similar to the commodity purchased by the user in the past can be automatically extracted. The commodity images and link information acquired from the commodity DB 26 are temporarily stored in the memory 23.

The CPU 21 transmits a transmission request to the mobile terminal 10-3 via the communication I/F 25 for information about the terminal (the model name, user name, etc.) (step S6). The CPU 11 receives the transmission request via the communication I/F 17 and transmits the information about the terminal to the server 20 via the communication I/F 17 (step S7).

The CPU 21 receives the information about the mobile terminal 10-3 via the communication I/F 25 (step S8). The CPU 21 compares the received information (e.g., the model name) with the information stored in the terminal DB 29 (the table shown in FIG. 2) to determine the data size capable of being transmitted at a time to the mobile terminal 10-3. The CPU 21 also acquires the determined data size's worth of commodity images and link information in ascending order of degree of similarity from the commodity images and link information acquired and stored in the memory in step S5. The CPU 21 transmits the acquired commodity images and link information to the mobile terminal 10-3 via the communication I/F 25 (step S9).

Figure 14:
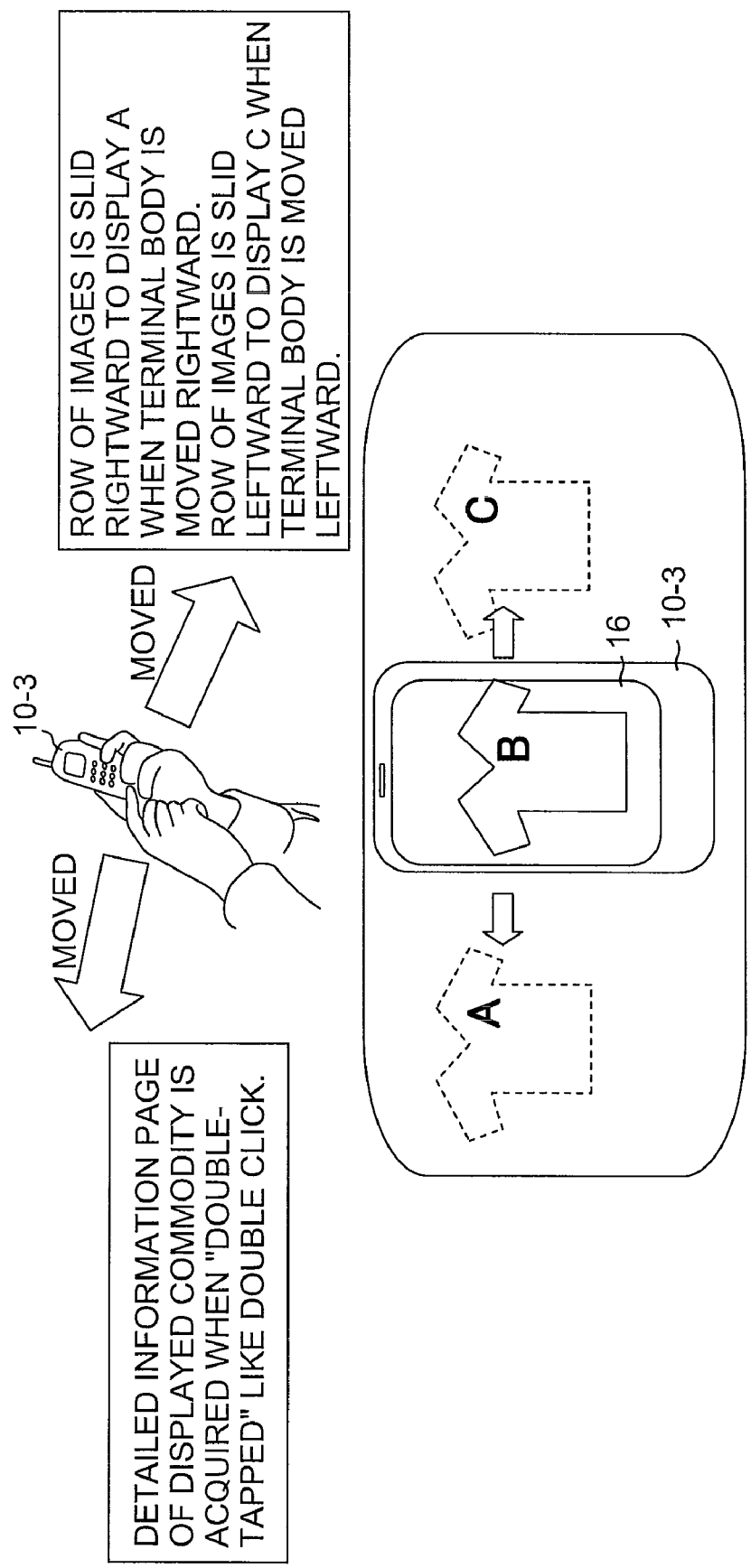
FIG. 14 is exemplary slide show display in the image display system 4.

The CPU 11 receives the commodity images and link information via the communication I/F 17 and displays the commodity images as a slide show on the monitor 16 via the display control unit 15 (step S21). FIG. 14 is a diagram showing an exemplary display form of the commodity images. The display control unit 15 generates display image data for each commodity image. The CPU 21 outputs the image data of an image with the lowest degree of similarity to the monitor 16 via the display control unit 15. As a result, only one commodity image with the lowest degree of similarity (e.g., the commodity image of the commodity A) is displayed on the entire monitor 16.

If the CPU 21 determines that the mobile terminal 10-3 is moved leftward based on the detection result in the angular velocity sensor 19, the CPU 21 slides the commodity image of the commodity A to the left and displays a commodity image with the second lowest degree of similarity (e.g., the commodity image of the commodity B) on the monitor 16.

If the CPU 21 determines that the mobile terminal 10-3 is moved leftward based on the detection result in the angular velocity sensor 19 while the commodity image of the commodity B is displayed on the monitor 16, the CPU 21 slides the commodity image of the commodity B to the left and displays a commodity image with the third lowest degree of similarity (e.g., the commodity image of the commodity C) on the monitor 16. If the CPU 21 determines that the mobile terminal 10-3 is moved rightward based on the detection result in the angular velocity sensor 19 while the commodity image of the commodity B is displayed on the monitor 16, the CPU 21 slides the commodity image of the commodity B to the right and displays the commodity image of the commodity A with the lowest degree of similarity on the monitor 16.

If the CPU 21 determines that the mobile terminal 10-3 is moved rightward based on the detection result in the angular velocity sensor 19 while the commodity image of the commodity A is displayed on the monitor 16, the CPU 21 slides the commodity image of the commodity A to the right and displays a commodity image with the highest degree of similarity on the monitor 16 among the commodity images transmitted to the mobile terminal 10-3.

Thus, the commodity images are displayed as a slide show. The CPU 11 determines whether selection input for a commodity image is provided (step S19). The selection input for a commodity image is provided by the user pressing twice, i.e., double-tapping, the touch panel 14-1 when a desired commodity image is displayed on the monitor 16.

If selection input for an image is not provided (NO in step S19), the slide show is continuously displayed (step S21).

If selection input for a commodity is provided, e.g., if selection input for the commodity image of B is provided when the commodity image of B is displayed on the monitor 16 as shown in FIG. 14 (YES in step S19), the CPU 11 recognizes that the commodity B is selected and transmits this information (e.g., the fact that the link information about the commodity B is selected) to the server 20 via the communication I/F 17 (step S12).

The CPU 21 receives the selection of the commodity B via the communication I/F 25, acquires the detailed information about the commodity B from the commodity DB 26, and transmits the detailed information to the mobile terminal 10-3 via the communication I/F 25 (step S13). The CPU 11 receives the detailed information via the communication I/F 17 and outputs the received detailed information to the monitor 16 via the display control unit 15 (step S14). Thus, the detailed information is displayed on the monitor 16.

The CPU 11 determines whether the commodity with the detailed information received is purchased (step S15). If the commodity is not purchased (NO in step S15), the slide show is continuously displayed (step S21).

If the commodity is purchased (YES in step S15), the CPU 11 transmits purchase information, including commodity information such as the name of the purchased commodity and user information about the user who purchases the commodity, to the server 20 via the communication I/F 17 (step S16).

The CPU 21 receives the purchase information via the communication I/F 25. The CPU 21 stores the commodity information such as the received commodity name in the user DB 27 in association with the user information, and stores feature amount of images of the commodity image associated with the received commodity name in the feature amount of images DB 28 in association with the user information (step S17).

According to this embodiment, the slide show can be displayed according to the user's instructions with simple and intuitive operations.

The present invention may be provided as a system composed of two apparatuses, i.e., a mobile terminal and a server, or may be provided as a mobile terminal that includes functions of a mobile terminal and a server. Besides the apparatuses, the present invention may also be provided as a program applied to the apparatuses.

What is claimed is:

1. An image display system including a server apparatus and a customer mobile terminal, wherein
the server apparatus comprises:
a commodity database in which images of commodities, detailed information about the commodities, and link information to the detailed information are stored in association with each other;
a commodity group determination device that determines a group of commodities to be transmitted to the mobile terminal among the commodities stored in the commodity database; and
a server-side transmission device that transmits, to the mobile terminal, images of the group of commodities determined by the commodity group determination device and link information to detailed information about the commodities corresponding to the images, and
the mobile terminal comprises:
a display device;
a terminal-side reception device that receives the images of the group of commodities and the link information to the detailed information about the commodities corresponding to the images, transmitted from the server apparatus;
a first display control device that sequentially displays the images of the group of commodities received by the terminal-side reception device one by one as a slide show on the display device, the first display control device controlling the display of the images of the commodities so that the entire image of each commodity displayed one by one is displayed on the entire display device;
a reception device that receives selection input for an image displayed on the display device;
a detailed information acquisition device that acquires, in response to the reception device receiving the selection input, detailed information about a commodity corresponding to the image for which the reception device has received the selection input, from the commodity database based on the link information received by the terminal-side reception device; and
a second display control device that displays the detailed information acquired by the detailed information acquisition device on the display device, wherein
the mobile terminal further comprises a customer information transmission device that transmits information about a customer having the mobile terminal, and
the server apparatus further comprises:
a customer information reception device that receives the information about the customer transmitted by the customer information transmission device; and
a customer database that stores the information about the customer received by the customer information reception device and a purchase history of a commodity purchased by the customer, in association with each other, wherein
the commodity group determination device determines the group of commodities to be transmitted to the mobile terminal among the commodities stored in the commodity database based on the commodity purchase history stored in the customer database, wherein
the customer database stores detailed information about the commodity purchased by the customer as the purchase history of the commodity purchased by the customer, and
the commodity group determination device compares the detailed information about the commodities stored in the commodity database with the detailed information about the commodity stored in the customer database and determines, as the group of commodities, commodities associated with detailed information that substantially matches the detailed information stored in the customer database, among the commodities stored in the commodity database.

2. The image display system according to claim 1, wherein the server apparatus further comprises a determination device that determines whether an image of a new commodity has been stored in the commodity database, and the commodity group determination device determines the group of commodities to be transmitted to the mobile terminal among the commodities stored in the commodity database if the determination device determines that an image of a new commodity has been stored.

3. The image display system according to claim 1, wherein the mobile terminal further comprises a request transmission device that requests data transmission from the server apparatus,
the server apparatus further comprises a request reception device that receives the data transmission request transmitted from the request transmission device, and
the commodity group determination device determines the group of commodities to be transmitted to the mobile terminal among the commodities stored in the commodity database in response to the request reception device receiving the data transmission request.

4. An image display system including a server apparatus and a customer mobile terminal, wherein
the server apparatus comprises:
a commodity database in which images of commodities, detailed information about the commodities, and link information to the detailed information are stored in association with each other;
a commodity group determination device that determines a group of commodities to be transmitted to the mobile terminal among the commodities stored in the commodity database; and
a server-side transmission device that transmits, to the mobile terminal, images of the group of commodities determined by the commodity group determination device and link information to detailed information about the commodities corresponding to the images, and
the mobile terminal comprises:
a display device;
a terminal-side reception device that receives the images of the group of commodities and the link information to the detailed information about the commodities corresponding to the images, transmitted from the server apparatus;
a first display control device that sequentially displays the images of the group of commodities received by the terminal-side reception device one by one as a slide show on the display device, the first display control device controlling the display of the images of the commodities so that the entire image of each commodity displayed one by one is displayed on the entire display device;
a reception device that receives selection input for an image displayed on the display device;
a detailed information acquisition device that acquires, in response to the reception device receiving the selection input, detailed information about a commodity corresponding to the image for which the reception device has received the selection input, from the commodity database based on the link information received by the terminal-side reception device; and
a second display control device that displays the detailed information acquired by the detailed information acquisition device on the display device, wherein
the mobile terminal further comprises a customer information transmission device that transmits information about a customer having the mobile terminal, and
the server apparatus further comprises:
a customer information reception device that receives the information about the customer transmitted by the customer information transmission device; and
a customer database that stores the information about the customer received by the customer information reception device and a purchase history of a commodity purchased by the customer, in association with each other, wherein
the commodity group determination device determines the group of commodities to be transmitted to the mobile terminal among the commodities stored in the commodity database based on the commodity purchase history stored in the customer database, wherein
the server apparatus further comprises a feature amount calculation device that calculates a feature amount from a commodity image,
the commodity database stores the image of each commodity and the feature amount calculated by the feature amount calculation device from the image of the commodity, in association with each other,
the customer database stores the feature amount calculated by the feature amount calculation device from an image of the commodity purchased by the customer as the purchase history of the commodity purchased by the customer, and
the commodity group determination device compares the feature amounts stored in the commodity database with the feature amount stored in the customer database and determines, as the group of commodities, commodities having feature amounts such that the difference from the feature amount stored in the customer database is substantially zero or not more than a predetermined threshold, among the commodities stored in the commodity database.

5. The image display system according to claim 4, wherein the mobile terminal further comprises a terminal information transmission device that transmits information about the mobile terminal, and
the server apparatus further comprises:
a terminal information reception device that receives the information about the mobile terminal transmitted by the terminal information transmission device;
a terminal database that stores information about mobile terminals; and
a number determination device that determines the number of commodity images capable of being transmitted to the mobile terminal based on the information about the mobile terminal received by the terminal information reception device and the information about mobile terminals stored in the terminal database, and
the server-side transmission device transmits, at a time to the mobile terminal, images of the number determined by the number determination device as capable of being transmitted to the mobile terminal, among the images of the group of commodities determined by the commodity group determination device.

6. The image display system according to claim 4, wherein the mobile terminal further comprises a direction input device to which a direction instruction is input by an operator, and wherein the first display control device displays the slide show by sequentially sliding the images of the commodities in the direction input by the direction input device.

7. The mobile terminal according to claim 6, wherein the direction input device comprises:
- an image-taking device that takes an image of a subject in front of the display device;
- a recognition device that recognizes the movement of the subject taken by the image-taking device; and
- a first direction determination device that identifies the direction of the movement of the subject recognized by the recognition device as the direction instruction input to the direction input device.

8. The mobile terminal according to claim 6, wherein the direction input device comprises:
- a vibration detection device that detects a vibration of the mobile terminal and the direction of the vibration; and
- a second direction determination device that identifies the direction of the vibration of the mobile terminal detected by the vibration detection device as the direction instruction input to the direction input device.

9. A server apparatus which transmits information and images about commodities to a mobile terminal via a network, the server apparatus comprising:
- a commodity database in which images of commodities, detailed information about the commodities, and link information to the detailed information are stored in association with each other;
- a commodity group determination device that determines a group of commodities to be transmitted to the mobile terminal among the commodities stored in the commodity database;
- a server-side transmission device that transmits, to the mobile terminal, images of the group of commodities determined by the commodity group determination device and link information to detailed information about the commodities corresponding to the images;
- a customer information reception device that receives the information about a customer transmitted from the mobile terminal;
- a customer database that stores the information about the customer received by the customer information reception device and a purchase history of a commodity purchased by the customer, in association with each other; and
- a feature amount calculation device that calculates a feature amount from a commodity image, wherein the commodity database stores the image of each commodity and the feature amount calculated by the feature amount calculation device from the image of the commodity, in association with each other, the customer database stores the feature amount calculated by the feature amount calculation device from an image of the commodity purchased by the customer as the purchase history of the commodity purchased by the customer, and the commodity group determination device compares the feature amounts stored in the commodity database with the feature amount stored in the customer database as the purchase history and determines, as the group of commodities to be transmitted to the mobile terminal, commodities having feature amounts such that the difference from the feature amount stored in the customer database is substantially zero or not more than a predetermined threshold, among the commodities stored in the commodity database.

* * * * *